(12) United States Patent
Gopalakrishna

(10) Patent No.: US 10,218,741 B2
(45) Date of Patent: Feb. 26, 2019

(54) IMMUNIZING NETWORK DEVICES USING A MALWARE MARKER

(71) Applicant: Acalvio Technologies, Inc., Cupertino, CA (US)

(72) Inventor: Rajendra A. Gopalakrishna, Bangalore (IN)

(73) Assignee: ACALVIO TECHNOLOGIES, INC., Cupertino, CA (US)

( * ) Notice: Subject to any disclaimer, the term of this patent is extended or adjusted under 35 U.S.C. 154(b) by 0 days.

(21) Appl. No.: 15/467,276

(22) Filed: Mar. 23, 2017

(65) Prior Publication Data

US 2018/0198821 A1 Jul. 12, 2018

(30) Foreign Application Priority Data

Jan. 12, 2017 (IN) .............................. 201741001265

(51) Int. Cl.
*H04L 29/06* (2006.01)
*G06F 21/53* (2013.01)

(52) U.S. Cl.
CPC .......... *H04L 63/1491* (2013.01); *G06F 21/53* (2013.01); *H04L 63/145* (2013.01); *H04L 63/1416* (2013.01)

(58) Field of Classification Search
None
See application file for complete search history.

(56) References Cited

U.S. PATENT DOCUMENTS

| 8,204,984 | B1 | 6/2012 | Aziz et al. |
| 9,495,188 | B1* | 11/2016 | Ettema ................ G06F 9/45533 |
| 9,507,939 | B1* | 11/2016 | Lukacs ................ G06F 3/0622 |
| 2007/0256129 | A1* | 11/2007 | Jung ...................... H04L 69/14 726/24 |
| 2009/0125902 | A1 | 5/2009 | Ghosh et al. |
| 2015/0052605 | A1* | 2/2015 | Yu ............................ G06F 21/56 726/23 |

(Continued)

OTHER PUBLICATIONS

Wichmann et al., "Using Infection Markers as a Vaccine against Malware Attacks", 2012, IEEE, pp. 737-742.*

*Primary Examiner* — Henry Tsang
(74) *Attorney, Agent, or Firm* — Kilpatrick Townsend & Stockton LLP

(57) ABSTRACT

Provided are systems, methods, and computer program products for a cyber-vaccination technique. In various implementations, the cyber-vaccination technique includes using a network device that is infected by a malware program to determining a marker generated by the malware program. The marker may indicate to the malware program that the network device has been infected by the malware program. Determining the marker can include identifying a placement of the marker on the network device. The technique further includes identifying one or more other network devices that have not previously been infected by the malware program. The technique further includes automatically distributing copies of the marker. When a copy of the marker is received at one of the previously identified, uninfected network devices, the identified network device can place the marker on the identified network device according to the identified placement.

21 Claims, 25 Drawing Sheets

(56) References Cited

U.S. PATENT DOCUMENTS

| | | | | |
|---|---|---|---|---|
| 2015/0067862 A1* | 3/2015 | Yu | ................. | H04L 63/145 |
| | | | | 726/24 |
| 2015/0244730 A1* | 8/2015 | Vu | ................. | H04L 63/145 |
| | | | | 726/24 |

* cited by examiner

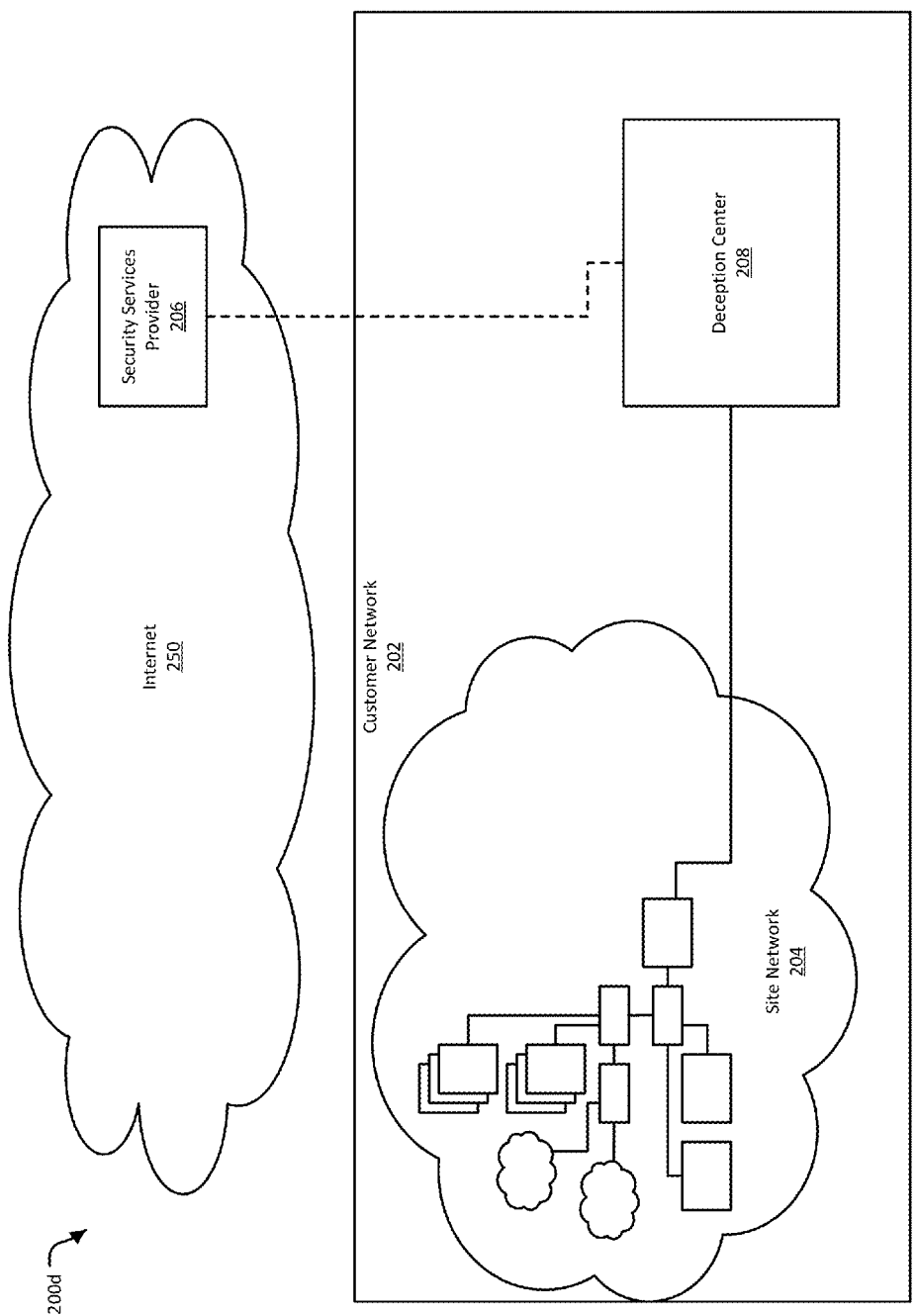

IMMUNIZING NETWORK DEVICES USING A MALWARE MARKER

CROSS REFERENCES TO RELATED APPLICATIONS

This application claims the benefit of and priority to Indian Provisional Application Number 201741001265, filed on Jan. 12, 2017, which is incorporated herein by reference in its entirety.

BRIEF SUMMARY

Cyber-vaccination and cyber antibodies borrow concepts known in medicine. In medicine, a vaccine often uses a weakened or killed organism to stimulate the human body to create antibodies against the organism. Similarly, in the realm of computing, the tools used by malware programs can be used against the very same malware programs to defend computing systems from being infected by these malware programs.

Provided are systems, methods, including computer-implemented methods, and computer-program products for a cyber-vaccination technique. In various implementations, the cyber-vaccination technique includes using a network device that is infected by a malware program to determining a marker generated by the malware program. The marker may indicate to the malware program that the network device has been infected by the malware program. Determining the marker can include identifying a placement of the marker on the network device. The technique further includes identifying one or more other network devices that have not previously been infected by the malware program. The technique further includes automatically distributing copies of the marker. When a copy of the marker is received at one of the previously identified, uninfected network devices, the identified network device can place the marker on the identified network device according to the identified placement.

In various implementations, determining the marker according to the cyber-vaccination technique includes comparing a first snapshot of the infected network device with a second snapshot of the infected network device. The first snapshot was taken before the infection by the malware program occurred, and the second snapshot was taken after the infection occurred. Determining the marker further includes determining one or more differences between the first snapshot and the second snapshot, and identifying a difference from the among the differences as the marker.

In some implementations, determining the marker includes determining a change in a system registry of the network device. In some implementations, determining the marker includes determining a change in a file system of the network device. In some implementations, determining the marker includes identifying a process running on the network device. In some implementations, determining the marker includes identifying a user logged in to the network device. In some implementations, determining the marker includes determining a change in a system memory of the network device. In some implementations, determining the marker includes identifying an open port of the network device.

In various implementations, the cyber-vaccination technique further includes identifying the network device as infected by the malware program. In various implementations, the technique further includes activating the malware program on the network device.

In various implementations, presence of a copy of the marker on an uninfected network device from the one or more other network devices represents the network device as infected by the malware program.

In various implementations, determining the marker occurs in real time.

In various implementations, automatically distributing the copies of the marker includes using a remote administration tool.

Also provided are systems, methods, and computer-program products for a cyber-antibody technique. In various implementations, the cyber-antibody technique includes using a network device that has been infected with an unknown malware program to monitor packets sent by this network device onto a network. The technique further includes identifying a packet that is associated with the unknown malware program. The packet can be identified from among the monitored packets, and identifying the packet can include determining a characteristic of the packet. The technique further includes identifying other packets having a characteristic similar to the characteristic of the identified packet. The technique further includes inserting data associated with a known malware program into the one or more other packets. The technique further includes automatically distributing the characteristic of the packet. When the characteristic is received at another network device, the characteristic can be used to identify additional packets having a characteristic similar to the characteristic of the packet.

In various implementations, in accordance with the cyber antibody technique, identifying the packet associated with the malware program includes determining a process that generated the packet.

In various implementations, determining the characteristic of the packet includes examining a header portion of the packet. In some implementations, examining the header portion includes identifying one or more of a source address, a destination address. a network service type, an identifier, a class, or a label.

In various implementations, determining the characteristic of the packet includes examining a payload portion of the packet. In some implementations, examining the payload portion includes identifying for a character string.

In various implementations, the data associated with the known malware program infects the one or more other packets with the known malware program. In some implementations, the known malware program is blocked by network security infrastructure devices.

In various implementations, monitoring the packets includes monitoring for minutes, hours, days, or weeks.

In various implementations, the cyber-antibody technique further includes receiving a new characteristic from the network. The new characteristic may be associated with a new malware program. The technique further includes configuring a process with the new characteristic. The process can insert the digital signature in other packets with a similar characteristic.

In various implementations, identifying the packet occurs in real time.

In various implementations, automatically distributing the characteristic includes using remote administration tools.

Also provided are systems, methods, and computer-program products for a generic cyber-vaccination technique. In various implementations, the generic cyber-vaccination technique includes using a network device to determine one or more characteristics of a testing environment. The testing environment can used to analyze malware programs. The technique further includes configuring a production network device used in network operations, which exclude analyzing malware programs. The production network device can configured using the characteristics of the testing environment. Configuring the production network device with the characteristics can cause the production network device to resemble the testing environment.

In various implementations, the testing environment involved in the generic cyber-vaccination technique includes a virtual machine. In various implementations, the one or more characteristics of the testing environment include a process associated with a virtual machine. In various implementations, the characteristics include a particular Media Access Control (MAC) address. In various implementations, characteristics include an entry in a system registry. In various implementations, the characteristics include one or more of a structure or content of a file system. In various implementations, the characteristics include an execution path of a process associated with the testing environment.

In various implementations, the generic cyber-vaccination technique includes automatically distributing the characteristics of the testing environment to one or more other network devices.

In various implementations, the generic cyber-vaccination technique includes configuring the network device with the one or more characteristics.

In various implementations, the generic cyber-vaccination technique includes receiving a malware program. The malware program may be configured to execute upon determining that the malware program is not in the testing environment.

BRIEF DESCRIPTION OF THE DRAWINGS

Illustrative embodiments are described in detail below with reference to the following figures:

FIGS. 2A-2D provide examples of different installation configurations that can be used for different customer networks;

DETAILED DESCRIPTION

Figure 1:
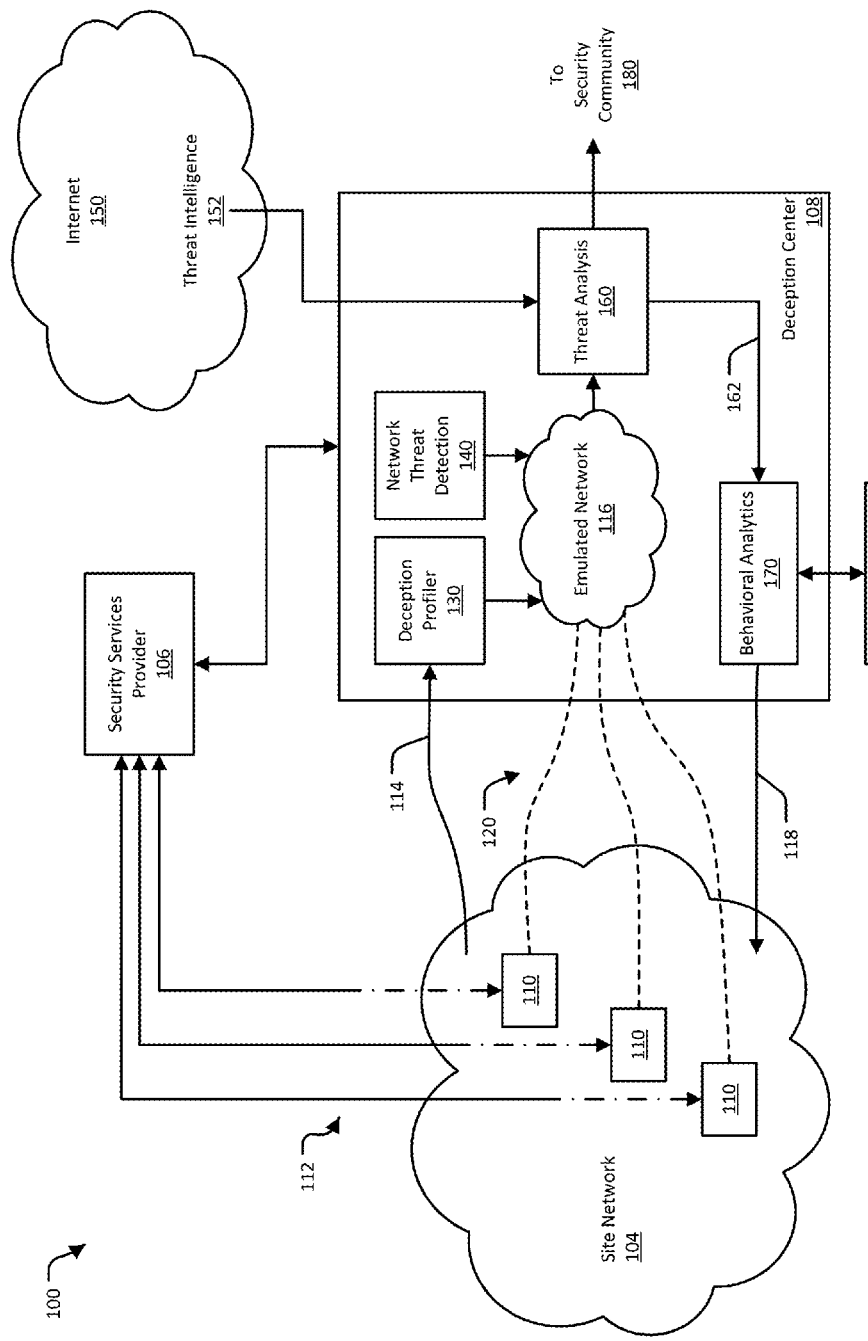
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting web sites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where an attacker interacts or engages with systems in the network to steal information or do harm to the network. An attacker may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

Anti-virus tools and so-called "sandbox" techniques can be used to detect and block malware, including for example ransomware, adware, bots, rootkits, spyware, Trojan horses, viruses, worms, and other types of malicious programs. Anti-virus tools include those produced by McAfee®, Kaspersky®, and Symantec®, among others. Sandbox techniques for detecting and blocking malware typically use a tightly controlled and closely monitored environment, referred to as a sandbox or testing environment, in which untrusted programs can be run and watched. Because the testing environment is carefully controlled and isolated, any harm done by the untrusted program will not spread to other computing systems. Sandbox testing environments are frequently virtual environments, which can be quickly reset to a clean state when testing is complete. Sandbox environments include those produced by FireEye®, among others.

Sandbox techniques and similar techniques are frequently used to analyze newly discovered malware. A malware program can be released into the sandbox, where the malware program can be studied and/or reverse engineered by security experts. Reverse engineering the malware can include determining the manner in which the malware operates, the harm intended by the malware, the manner in which the malware replicates itself, and/or identifying the point of entry of the malware into a network or computing system. Security engineers can generate a digital signature for the malware, for example by executing a program or function on data associated with the malware (e.g., a file, a file name, a process, a network packets, etc.). For example, the digital signature can be generated by executing a hash function on an executable file from which the malware program was launched. As used herein, the digital signature is typically a unique identifier for a specific malware program and can be used to identify the malware when, for example, anti-virus tools scan computer data.

Reverse engineering and producing digital signatures for each new malware program and each new variant of a malware program may not be possible or practicable. For example, 350,000 ransomware variants were released in just 2015. Furthermore, while digital signatures can be used to contain malware outbreaks, malware designers have been able to thwart identification through digital signatures. For example, some malware have been written as oligomorphic, polymorphic, or metamorphic programs, which can encrypt parts of themselves, or otherwise modify themselves. These techniques can disguise the malware, so that the malware will not match a digital signature in a block list.

Digital signatures also cannot defend against a "zero day" virus or malware. A zero day virus or malware is a previously unknown malicious program, for which a digital signature is not yet available. Anti-virus tools and other network security infrastructure may not be able to identify and block zero-day malware.

Security experts have developed other approaches for identifying malware that do not rely exclusively on digital signatures. For example, some network security products use behavioral detection techniques, heuristic detection techniques, artificial intelligence, machine learning, containerization, and sandbox testing environments, among other things. Challenges faced by these approaches include filtering out of false positives, convenience of configuration for ordinary users (e.g., non-security experts), and false negatives, that is, failing to detect or identify a malware program.

Once malware has been detected, a typical incident response is to manually isolate the compromised computing system. For example, the computing system can be shut down or the computing system's network access can be disabled. By isolating the compromised computing system, network administrators can attempt to prevent or limit the spread of the malware to other devices in the network. Such manual intervention, however, relies on the vigilance, speed, and skill of human operators, who may not be able to keep up with the sheer volume of malware attacks. Isolation of compromised computing systems can be accomplished in an automated fashion, but automated isolation relies on the ability of tools that can detect that the system has been compromised. Such tools may have varying degrees of capability.

In various implementations, provided are techniques for "vaccinating" a computing system against a malware attack, without needing to reverse engineer the malware program, or otherwise expend much effort analyzing the malware program. In various implementations, a cyber-vaccine technique includes determining a marker generated by the malware program. Malware programs often avoid re-infecting a system twice, and so use various markers, such as files, processes, registry entries, and other data to identify systems the malware program has already infected.

Cyber-vaccination techniques can be used to identify such markers. Once identified, the markers can be distributed to other computing systems, including ones not yet infected by the malware. Should the malware spread to these computing systems, the malware may detect the marker, and not infect these computing systems. Computing systems can thus be protected from infection.

In various implementations, also provided are techniques for providing computing systems with "antibodies" against malware attacks that use seemingly innocuous network communications to receive instructions from a malicious entity and/or to steal data. In some cases, malware programs establish "command and control" communication channels with entities outside of a local area network, such as somewhere on the Internet. Using a command and control channel the malware can receive instructions and/or send valuable data to the outside entity. The network communications with the outside entity can appear safe and innocent. For example, the communications can be social media posts, forum posts, and/or other network communications that, alone, may do no harm.

Cyber-antibody techniques can be used to identify such network traffic. Once identified, this seemingly harmless network traffic can be deliberately "tainted" or made to carry a known malware signature. The network traffic thus appears to contain malware, and because known malware is used, a network's security infrastructure will block the network traffic from reaching the Internet. The malware's command and control channel can thus be cut off, possibly preventing the malware from doing harm. The cyber-antibody can further be distributed to the computing systems in a network, so that, should these systems become infected with the same malware, the malware will be unable to establish a command and control communication channel. These computing systems can thus be protected from this particular malware.

In various implementations, also provided are techniques for providing a generic cyber-vaccine for computing systems in a network. As noted above, malware programs are sometimes designed to detect when the malware program is in a sandbox testing environment. For example, a malware program may look for the presence of particular processes or files. A generic cyber-vaccine can replicate the characteristics of a testing environment on production systems, such that productions systems—which would not be used for analyzing malware—resemble a testing environment. Malware programs designed not to trigger in a testing environment may thus not trigger on computing systems that have the generic cyber-vaccine. In this way, these computing systems can be protected from infection that are capable of detecting their environment.

I. Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network attackers. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANS. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organizations network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the security services provider 106 is controlled by the same entity as that controls the site network 104.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how an attacker infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators 162 that describe the suspect network activity, including indicating whether the suspect activity was or was not an actual threat. The threat analysis engine 160 may share these indicators 162 with the security community 180, so that other networks can be defended from the attack. The threat analysis engine 160 may also send the indicators 162 to the security services provider 106, so that the security services provider 106 can use the indicators 162 to defend other site networks.

In various implementations, the threat analysis engine 160 may also send threat indicators 162, or similar data, to a behavioral analytics engine 170. The behavioral analytics engine 170 may be configured to use the indicators 162 to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (STEM) 172 system. In various implementations, STEM includes software and/or services that can provide real-time analysis of security alerts generates by network hardware and applications. In various implementations, the deception center 108 can communicate with the STEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, and attack to proceed, so that as much can be learned about the attack as possible. Information about the attack can then be used to find vulnerabilities in the site network 104. Information about the attack can also be provided to the security community 180, so that the attack can be thwarted elsewhere.

II. Customer Installations

The network security system, such as the deception-based system described above, may be flexibly implemented to accommodate different customer networks. FIGS. 2A-2D provide examples of different installation configurations 200a-200d that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

Figure 2A:
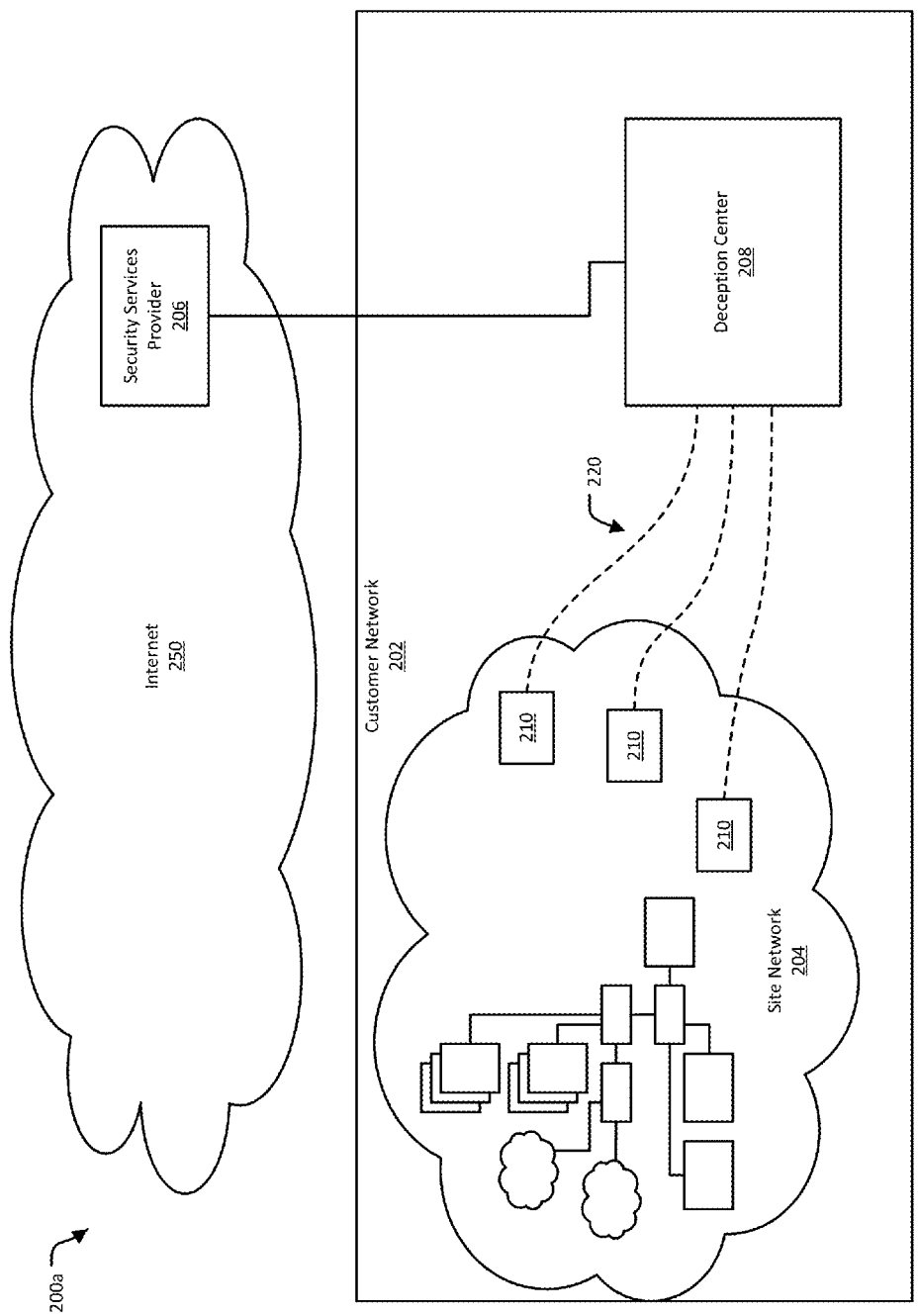

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

Figure 2B:
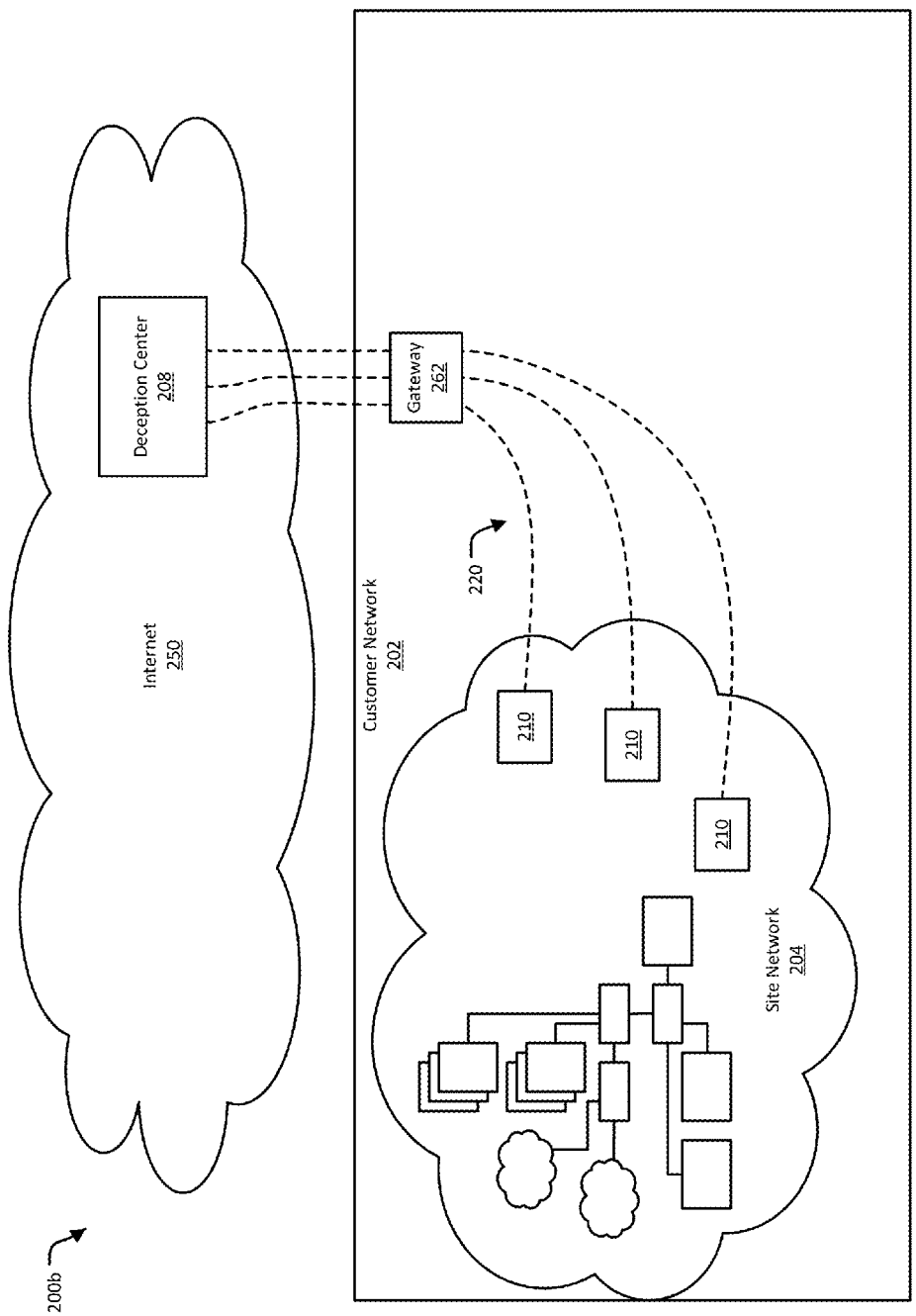

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

Figure 2C:
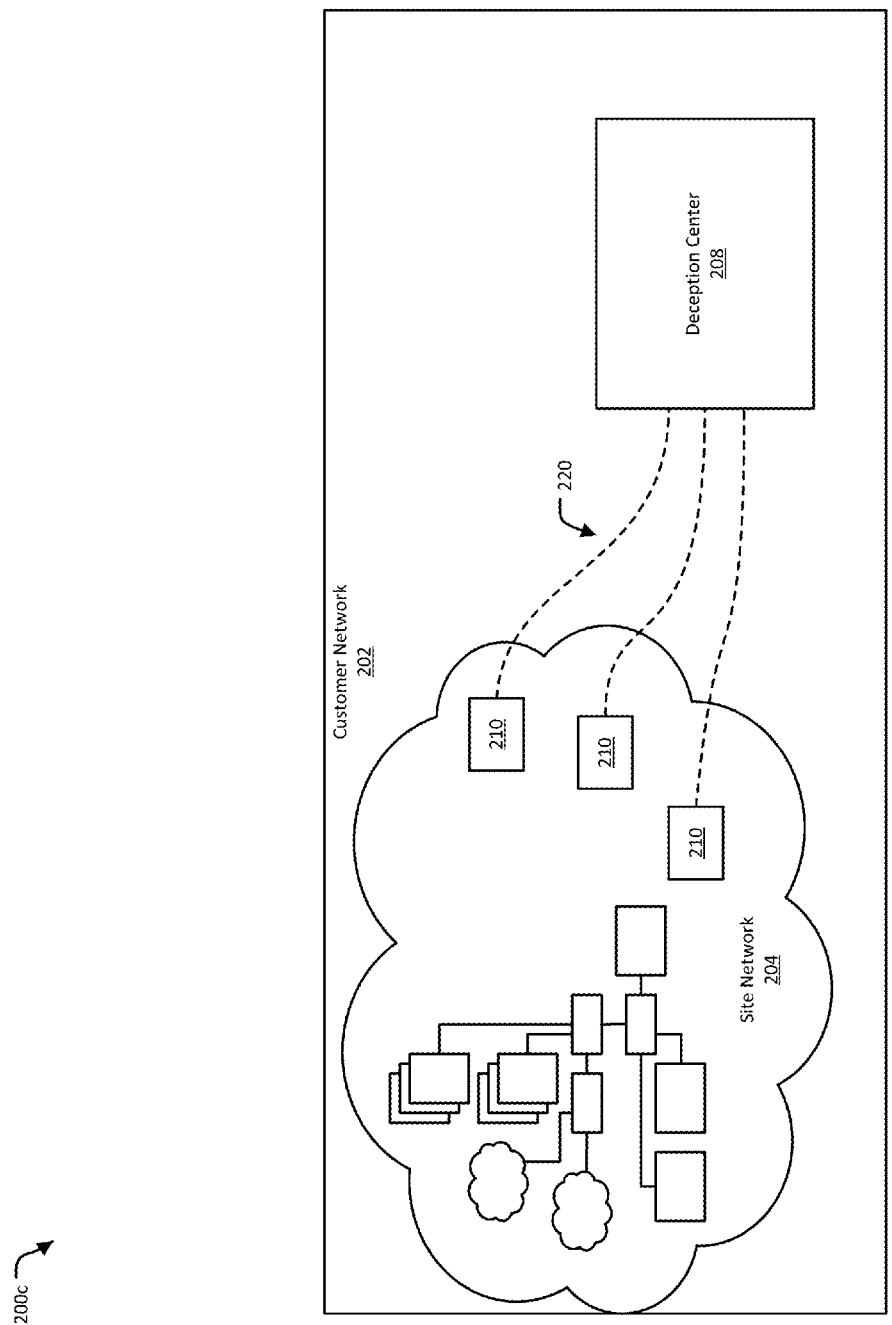

FIG. 2C illustrates another example of an installation configuration 200c, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

FIG. 2D illustrates another example of an installation configuration 200d. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

III. Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
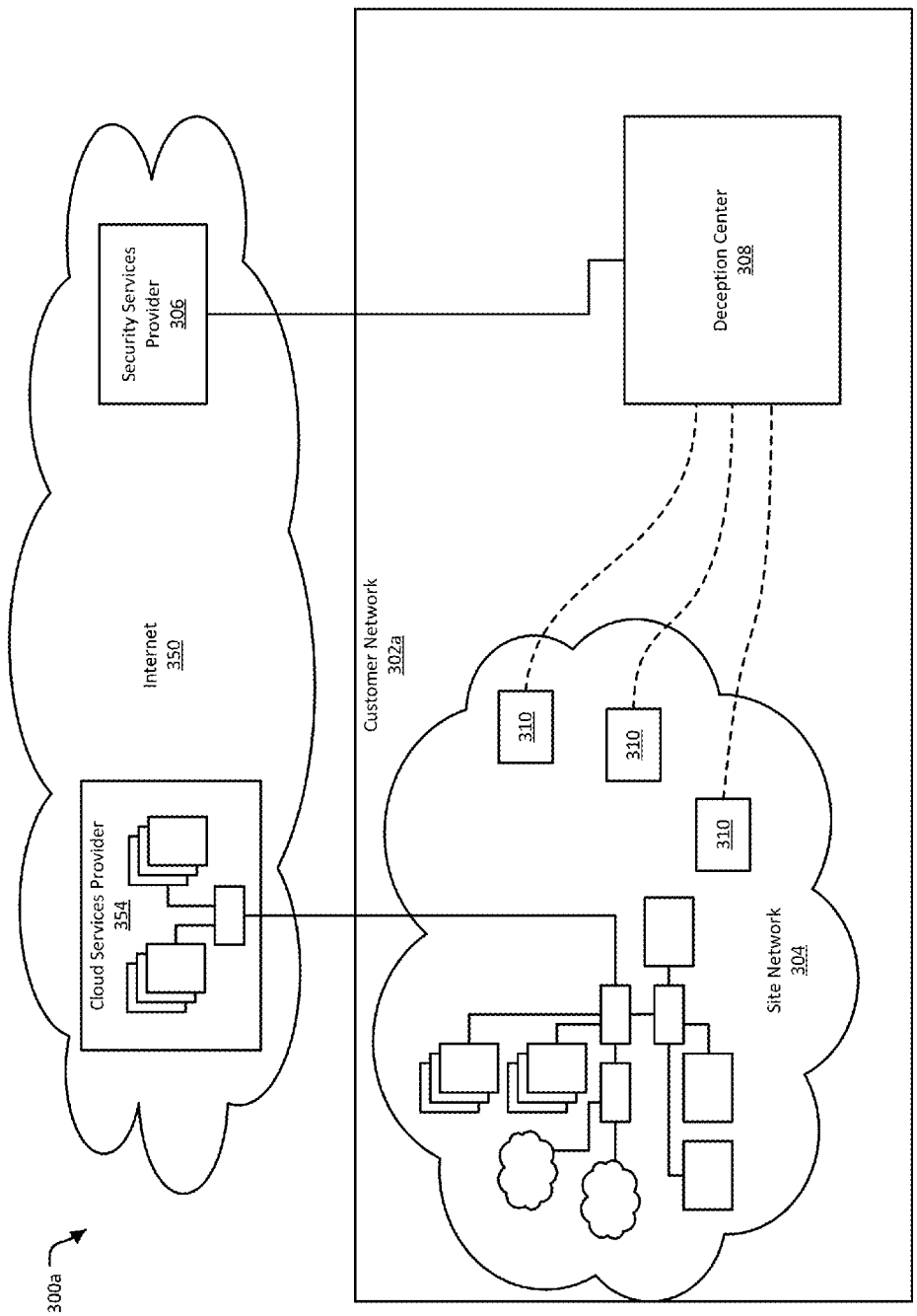
FIG. 3A-3B illustrate examples of customer networks where some of the customer networks' network infrastructure is "in the cloud," that is, is provided by a cloud services provider.
Figure 3B:
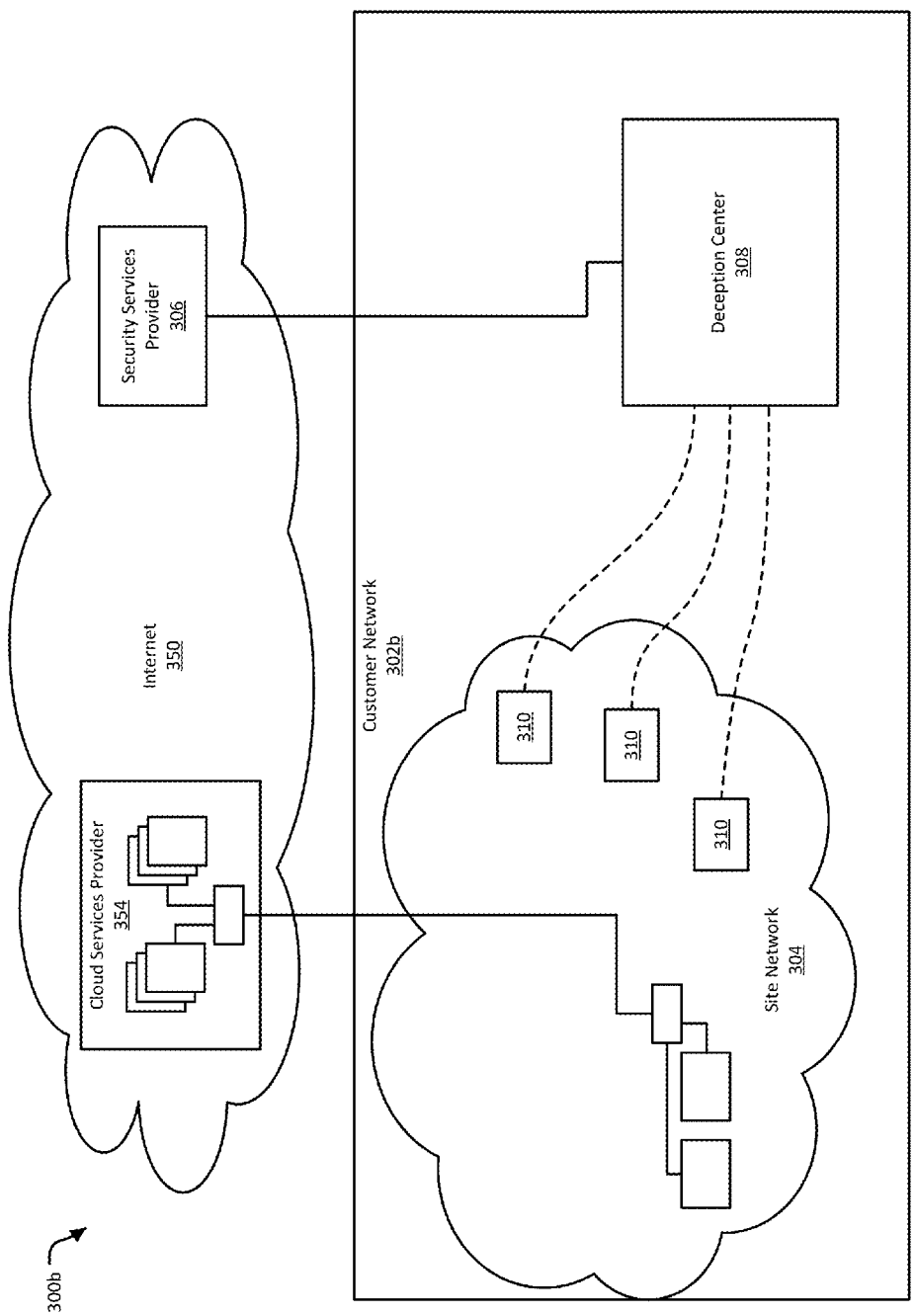

FIG. 3A-3B illustrate examples of customer networks 302a-302b where some of the customer networks' 302a-302b network infrastructure is "in the cloud," that is, is provided by a cloud services provider 354. These example customer networks 302a-302b may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302a-302b network is partially in a site network 304, and partially provided by the cloud services provider 354. In some cases, the site network 304 is the part of the customer networks 302a-302b that is located at a physical site owned or controlled by the customer network 302a-302b. For example, the site network 304 may be a network located in the customer network's 302a-302b office or campus. Alternatively or additionally, the site network 304 may include network equipment owned and/or operated by the customer network 302a-302b that may be located anywhere. For example, the customer networks' 302a-302b operations may consist of a few laptops owned by the customer networks 302a-302b, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302a-302b network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected form the sensors 310 installed in the site network 304, the deceptions may appear to be within the subnet provided by the cloud services provider 354.

In illustrated examples, the deception center 308 is installed inside the customer networks 302a-302b. Though not illustrated here, the deception center 308 can also be installed outside the customer networks 302a-302b, such as for example somewhere on the Internet 350. In some implementations, the deception center 308 may reside at the same location as the security service provider 306. When located outside the customer networks 302a-302b, the deception center 308 may connect to the sensors 310 in the site network 304 over various public and/or private networks.

FIG. 3A illustrates an example of a configuration 300a where the customer network's 302a network infrastructure is located in the cloud and the customer network 302a also has a substantial site network 304. In this example, the customer may have an office where the site network 304 is located, and where the customer's employees access and use the customer network 302a. For example, developers, sales and marketing personnel, human resources and finance employees, may access the customer network 302a from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates and example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g, in a co-working space, library, or coffee shop). When no laptops are connected to the cloud services provider 354, the customer network 302b may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
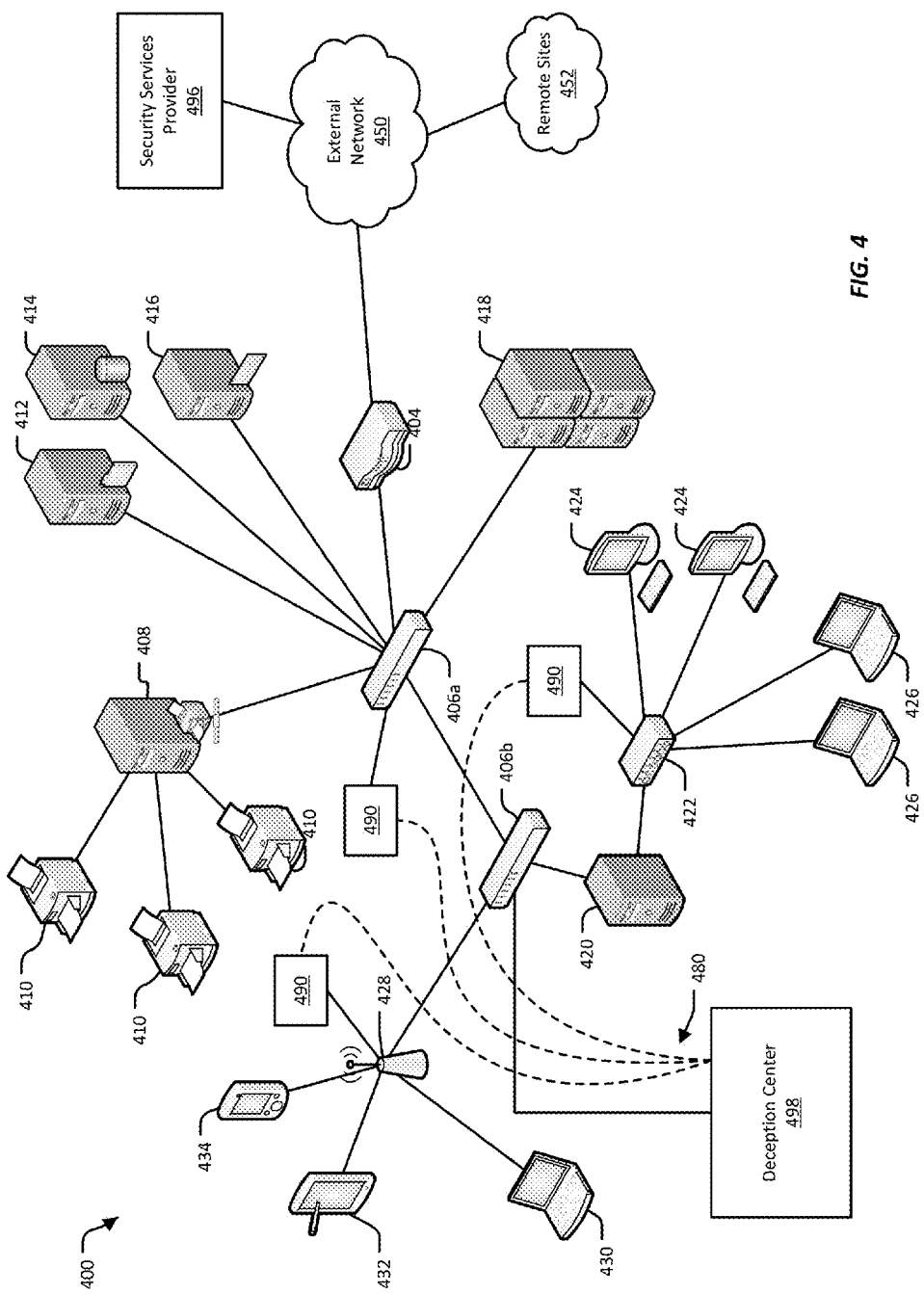
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406a. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system. In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a-406b, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
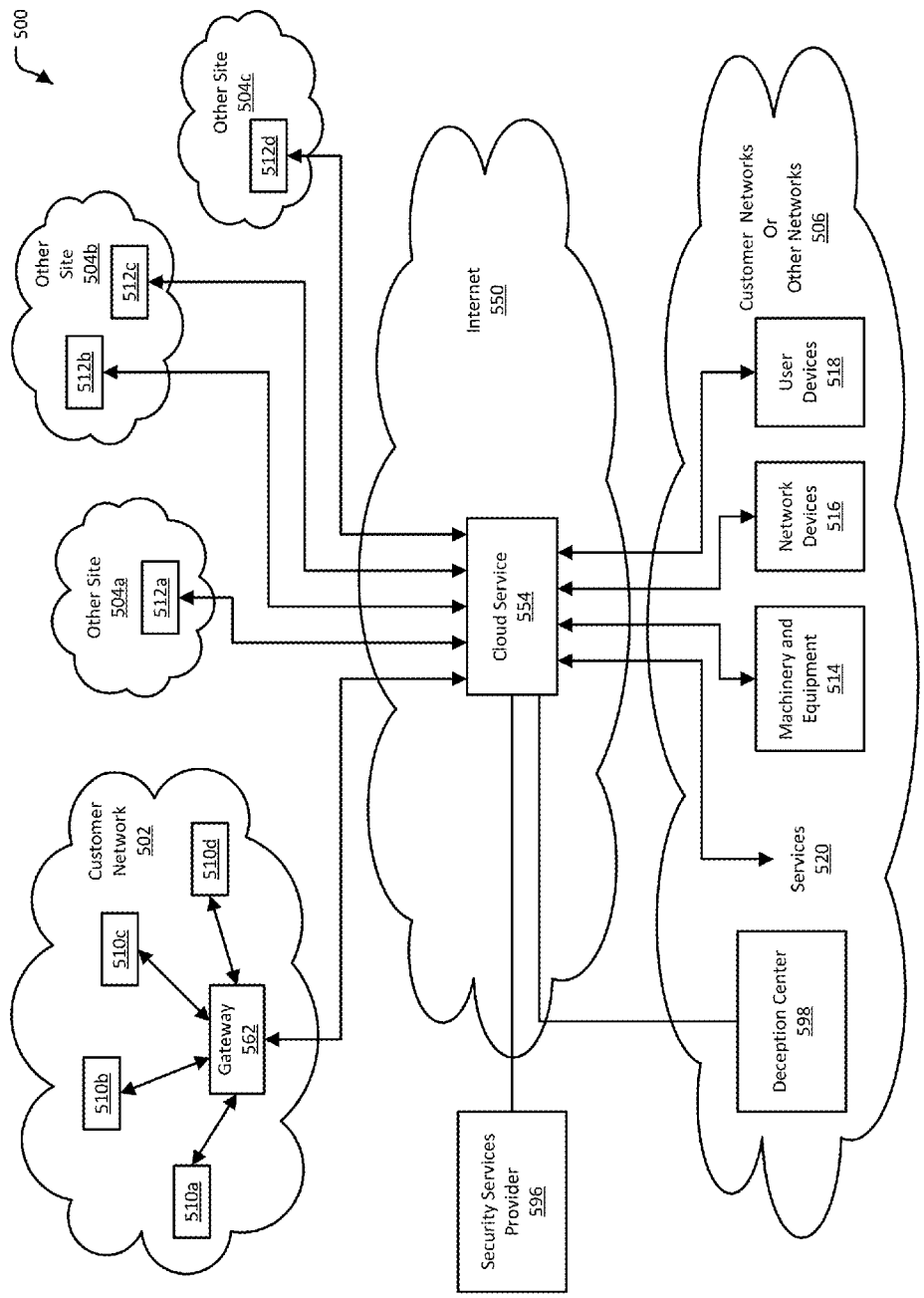
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-512d, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 598 and/or a security service provider 596 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510a-510d, 512a-512d can be used to monitor traffic and road conditions. In this example, the cloud service 554 can attempt to optimize the flow of traffic and also provide traffic safety. For example, the sensors 510a-510d, 512a-512d can include a sensor 512a on a bridge that monitors ice formation. When the sensor 512a detects that ice has formed on the bridge, the sensor 512a can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512a, the cloud service 554, and the machinery and equipment 514 is automated, requiring little or no management by human operators.

In various implementations, the cloud service 554 collects or receives data from sensors 510a-510d, 512a-512d, distributed across one or more networks. The sensors 510a-510d, 512a-512d include devices capable of "sensing" information, such as air or water temperature, air pressure, weight, motion, humidity, fluid levels, noise levels, and so on. The sensors 510a-510d, 512a-512d can alternatively or additionally include devices capable of receiving input, such as cameras, microphones, touch pads, keyboards, key pads, and so on. In some cases, a group of sensors 510a-510d may be common to one customer network 502. For example, the sensors 510a-510d may be motion sensors, traffic cameras, temperature sensors, and other sensors for monitoring traffic in a city's metro area. In this example, the sensors 510a-510d can be located in one area of the city, or be distribute across the city, and be connected to a common network. In these cases, the sensors 510a-510d can communicate with a gateway device 562, such as a network gateway. The gateway device 562 can further communicate with the cloud service 554.

In some cases, in addition to receiving data from sensors 510a-510d in one customer network 502, the cloud service 554 can also receive data from sensors 512a-512d in other sites 504a-504c. These other sites 504a-504c can be part of the same customer network 502 or can be unrelated to the customer network 502. For example, the other sites 504a-504c can each be the metro area of a different city, and the sensors 512a-512d can be monitoring traffic for each individual city.

Generally, communication between the cloud service 554 and the sensors 510a-510d, 512a-512d is bidirectional. For example, the sensors 510a-510d, 512a-512d can send information to the cloud service 554. The cloud service 554 can further provide configuration and control information to the sensors 510a-510d, 512a-512d. For example, the cloud service 554 can enable or disable a sensor 510a-510d, 512a-512d or modify the operation of a sensor 510a-510d, 512a-512d, such as changing the format of the data provided by a sensor 510a-510d, 512a-512d or upgrading the firmware of a sensor 510a-510d, 512a-512d.

In various implementations, the cloud service 554 can operate on the data received from the sensors 510a-510d, 512a-512d, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510a-510d, 512a-512d, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510a-510d. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat.

To provide security for the IoT network 500, in various implementations the deception center 598 may communicate with the sensors 510a-5106d, 512a-512d installed in the IoT network 500, for example through the cloud service 554. In some implementations, the IoT network 500 can include more than one deception center 598. For example, each of customer network 502 and customer networks or other networks 506 can include a deception center 598.

In some implementations, the deception center 598 and the sensors 510a-510d, 512a-512d interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510a-510d, 512a-512d, such as enabling the deception center 598 and the sensors 510a-510d, 512a-512d to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
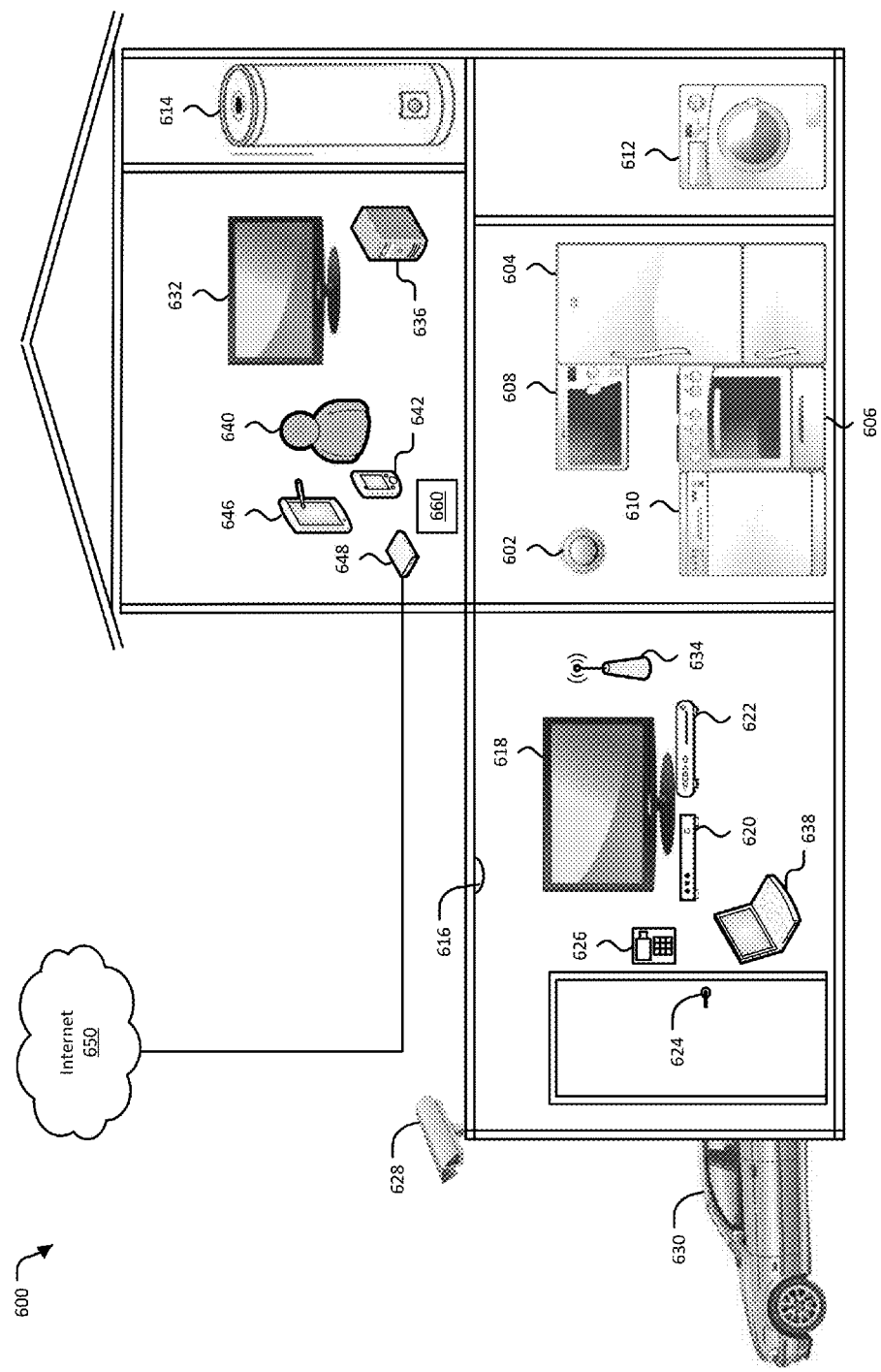
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an ISP. The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
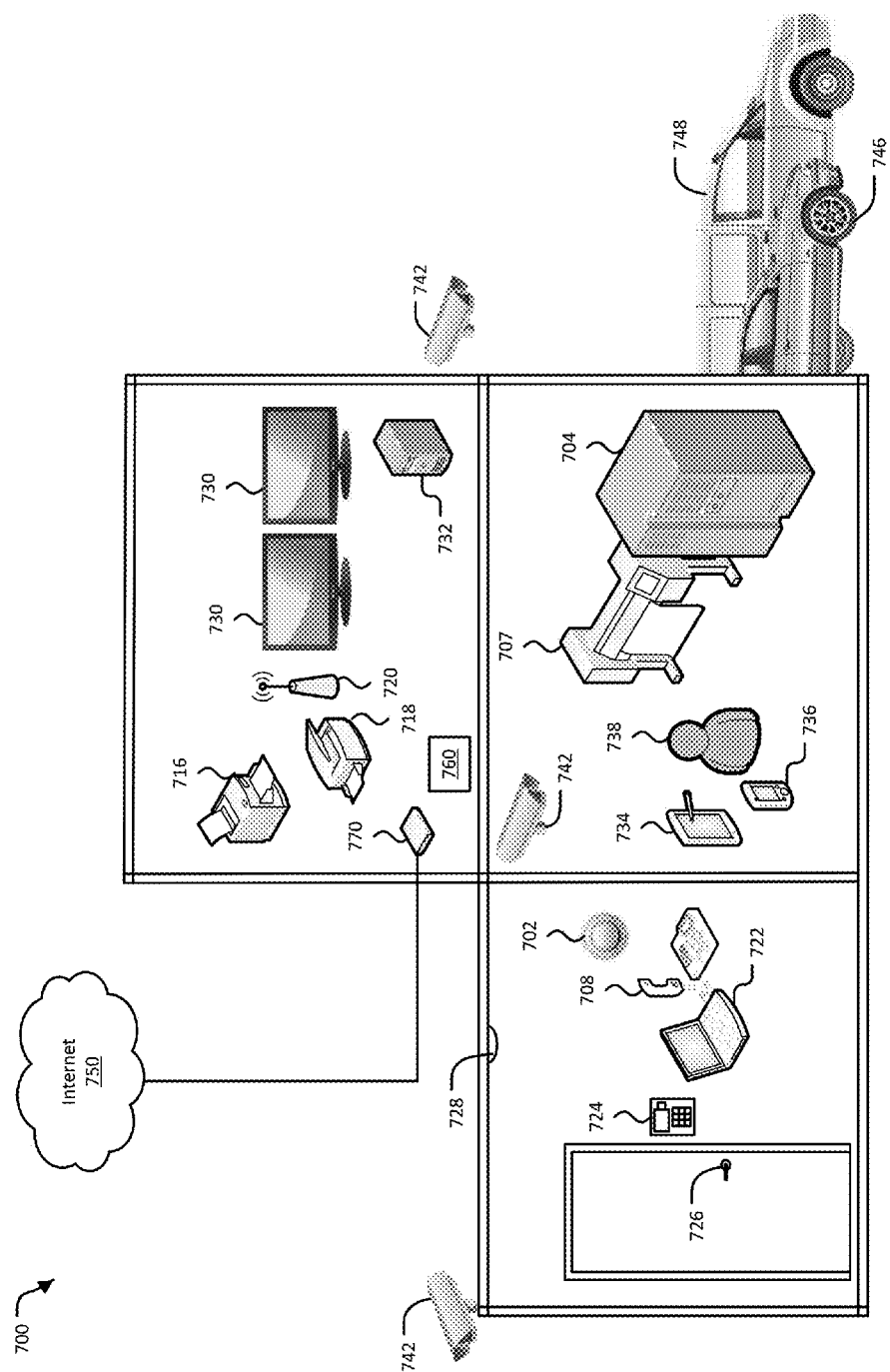
FIG. 7 illustrates an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 707. The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
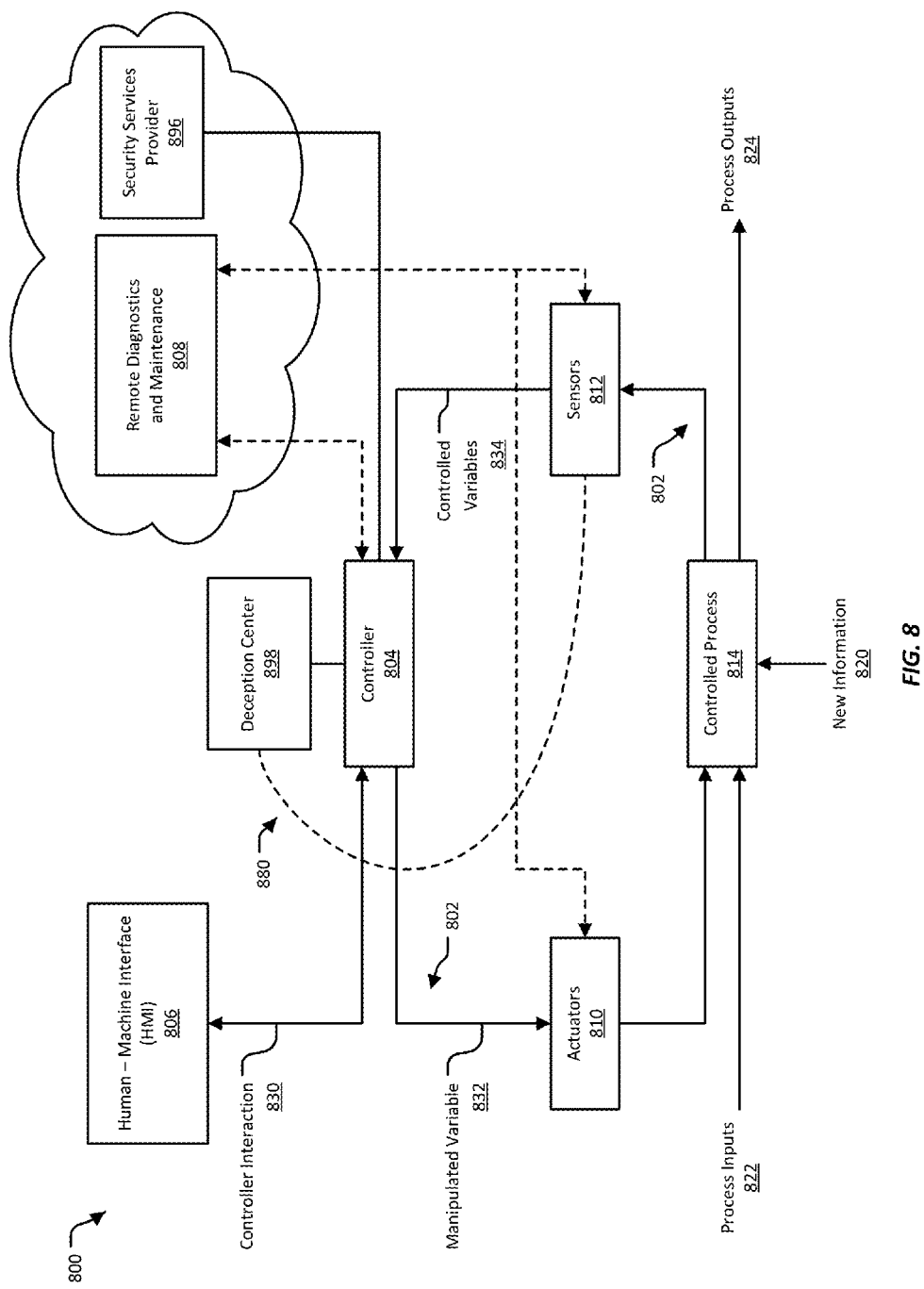
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 812 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance utilities 808 may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
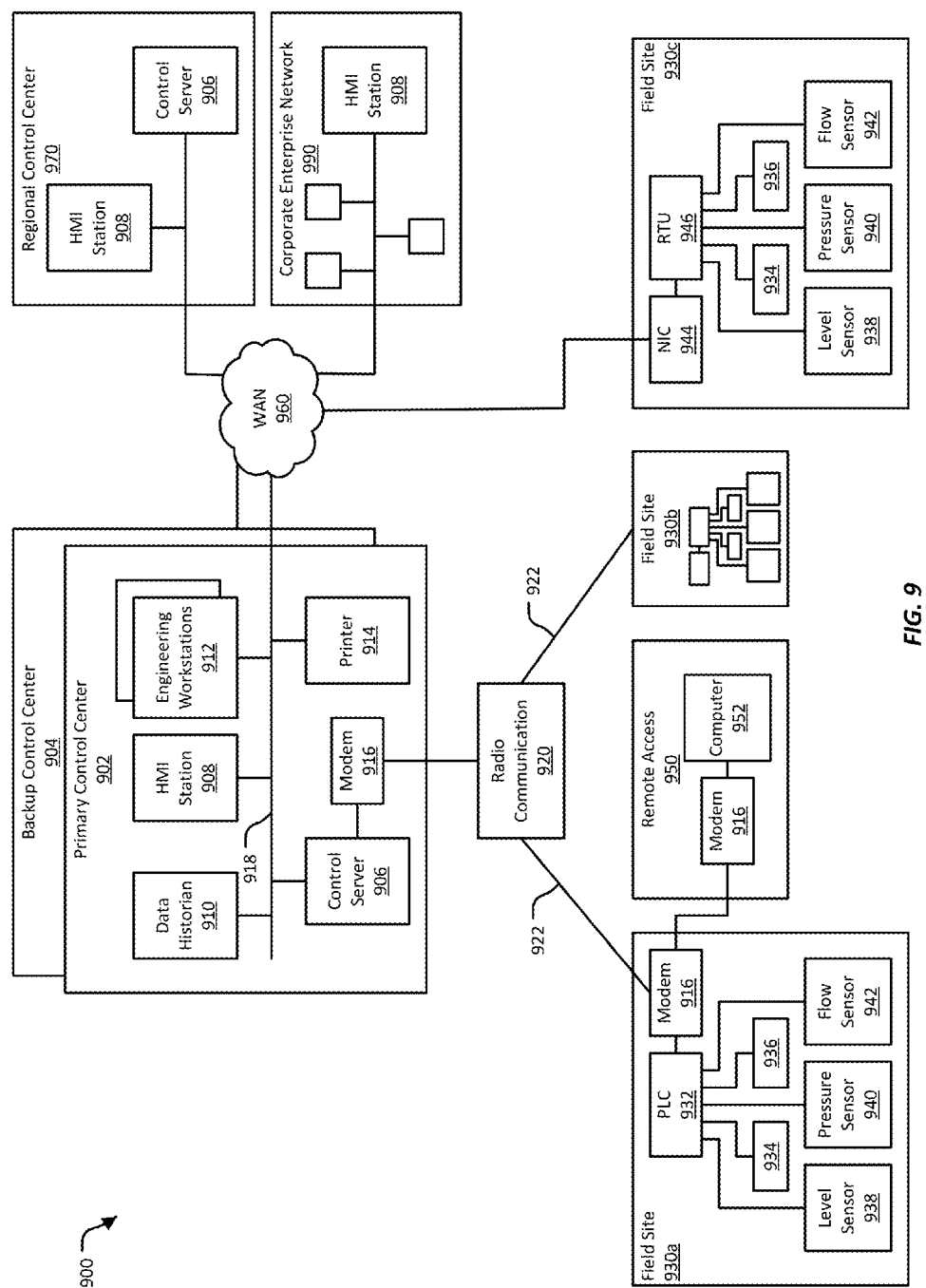
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930*a*-930*c*. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 918. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930*a*-930*c*. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930*a*-930*c* using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930*a*-930*b* using radiofrequency signals 922. Some field sites 930*a*-930*b* may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930*a*-930*c* and display this information using the human-machine interface station 908. The primary control center 902 may also generate actions based on detected events. The primary control center 902 may, for example, poll field devices at the field sites 930*a*-930*c* for data at defined intervals (e.g., 5 or 60 seconds), and can send new set points to a field device as required. In addition to polling and issuing high-level commands, the primary control center 902 may also watch for priority interrupts coming from the alarm systems at the field sites 930*a*-930*c*.

In this example, the primary control center 902 uses point-to-point connections to communication with three field sites 930a-930c, using radio telemetry for two communications with two of the field sites 930a-930b. In this example, the primary control center 902 uses a wide area network (WAN) 960 to communicate with the third field site 930c. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930a-930c. These protocols may use telemetry techniques such as provided by telephone lines, cables, fiber optics, and/or radiofrequency transmissions such as broadcast, microwave, and/or satellite communications.

The field sites 930a-930c in this example perform local control of actuators and monitor local sensors. For example, a first field site 930a may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930a, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (IEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930a-930c are often equipped with remote access capability that allows field operators to perform remote diagnostics and repairs. For example, the first remote 930a may include a modem 916 connected to the PLC 932. A remote access 950 site may be able to, using a dial up connection, connect to the modem 916. The remote access 950 site may include its own modem 916 for dialing into to the field site 930a over a telephone line. At the remote access 950 site, an operator may use a computer 952 connected to the modem 916 to perform diagnostics and repairs on the first field site 930a.

The example SCADA system 900 includes a second field site 930b, which may be provisioned in substantially the same way as the first field site 930a, having at least a modem and a PLC or Remote Terminal that controls and monitors some number of actuators and sensors.

The example SCADA system 900 also includes a third field site 930c that includes a network interface card (NIC) 944 for communicating with the system's 900 WAN 960. In this example, the third field site 930c includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 990. The regional control center 970 may provide a higher level of supervisory control. The regional control center 970 may include at least a human-machine interface station 908 and a control server 906 that may have supervisory control over the control server 906 at the primary control center 902. The corporate enterprise network 990 typically has access, through the system's 900 WAN 960, to all the control centers 902, 904 and to the field sites 930a-930c. The corporate enterprise network 990 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
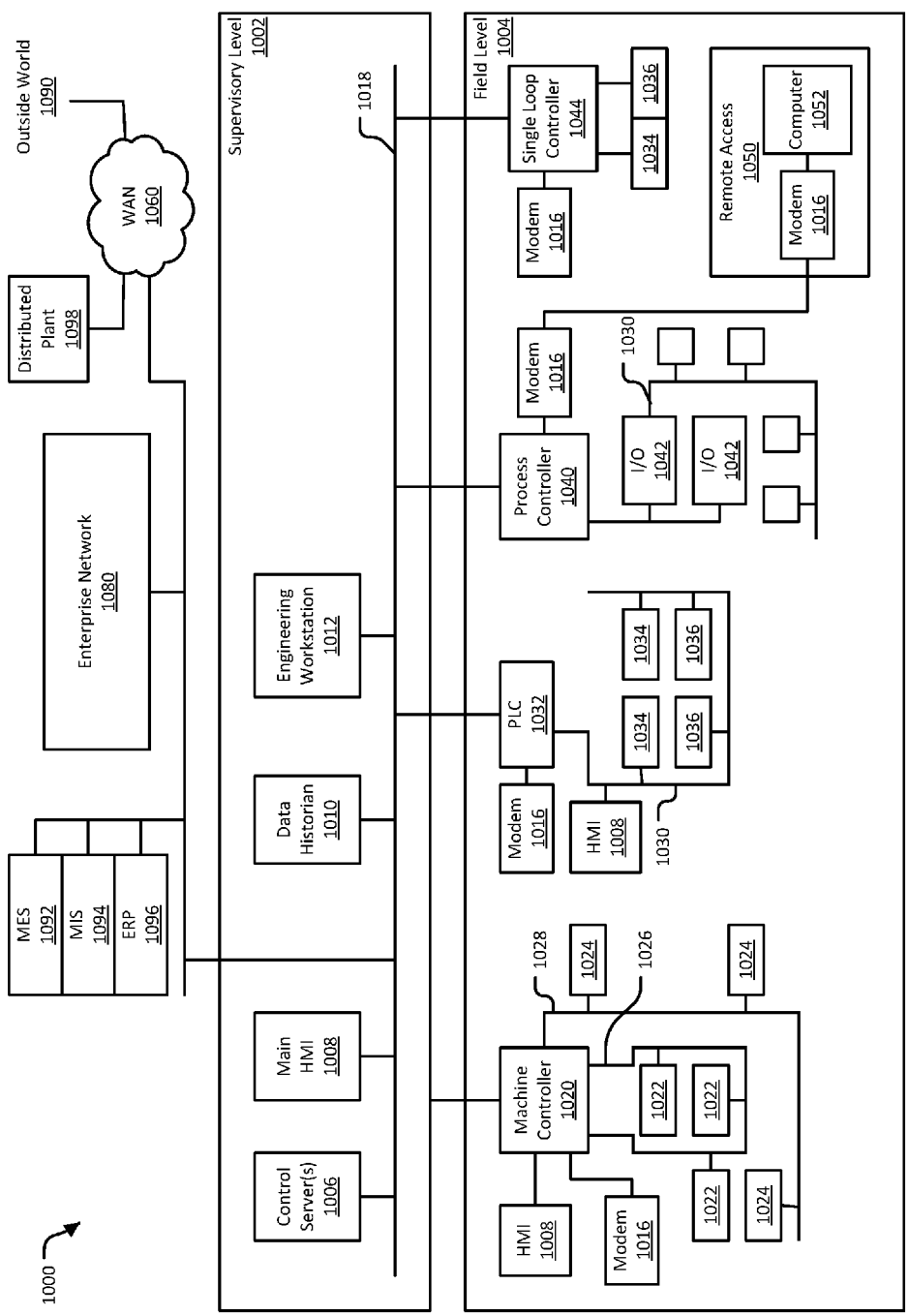
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control sub-components. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An MES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
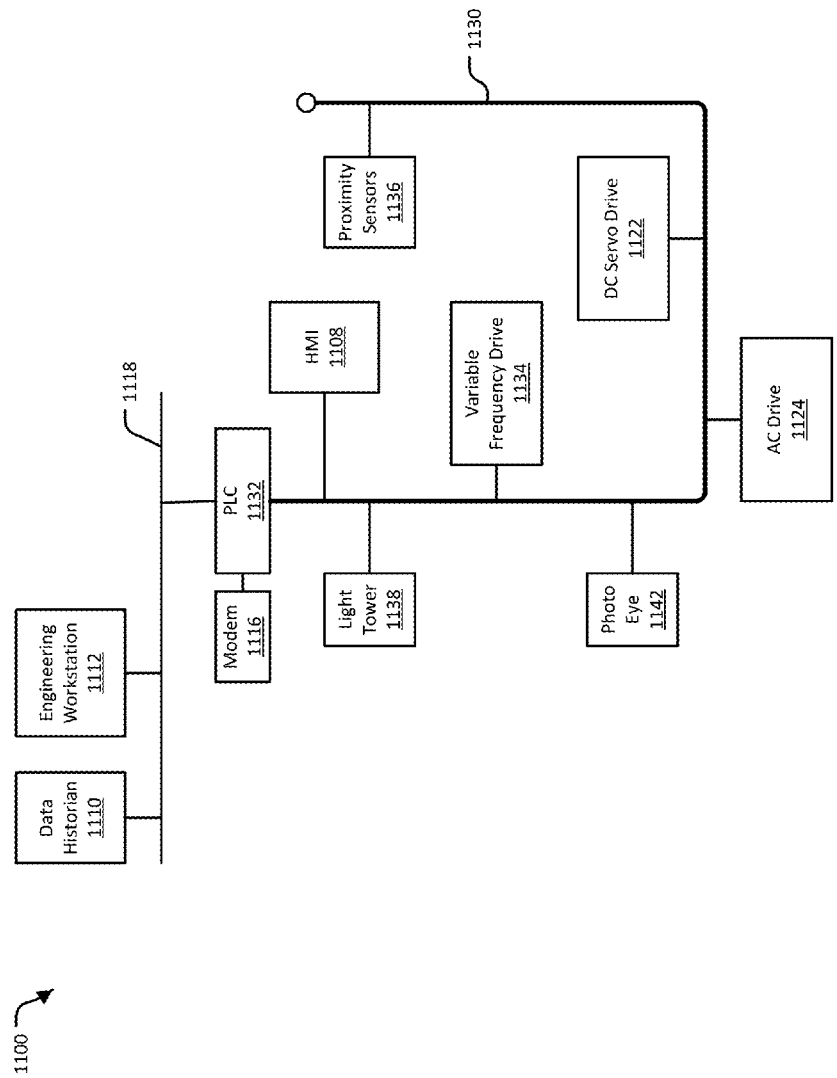
FIG. 11 illustrates an example of a PLC implemented in a manufacturing control process.

FIG. 11 illustrates an example of a PLC 1132 implemented in a manufacturing control process. The PLC 1132 in this example monitors and controls various devices over fieldbus network 1130. The PLC 1132 may be connected to a LAN 1118. An engineering workstation 1112 may also be connected to the LAN 1118, and may include a programming interface that provides access to the PLC 1132. A data historian 1110 on the LAN 1118 may store data produced by the PLC 1132.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as TCP/IP to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

IV. Cyber Vaccines and Antibodies

In various implementations, the systems and methods discussed above can be used to implement cyber vaccines and antibodies.

Malware programs often avoid re-infecting a system twice, and so use various markers, such as files, processes, registry entries, and other data to identify systems the malware program has already infected. In various implementations, a cyber-vaccine technique includes determining a marker generated by the malware program, and using the marker to prevent other network devices from becoming infected by the same malware program.

Malware programs can sometimes alternatively or additionally establish "command and control" communication channels with entities outside of a site network. Using a command and control channel the malware can receive instructions and/or send valuable data to the outside entity. Cyber-antibody techniques can be used to identify network traffic sent using this communication channel. Once identified, this seemingly harmless network traffic can be deliberately "tainted" or made to carry a known malware signature so that the network traffic is blocked by a site network's security perimeter. The taint can be put on any network device, which can protect the network device from also establishing communications with the outside entity.

Malware programs can sometimes also detect whether the malware program is executing within a sandbox testing environment. For example, a malware program may look for the presence of particular processes or files. A generic cyber-vaccine can replicate the characteristics of a testing environment on production systems, such that productions systems—which would not be used for analyzing malware—resemble a testing environment. Malware programs designed not to trigger in a testing environment may thus not trigger on computing systems that have the generic cyber-vaccine. In this way, these computing systems can be protected from infection by malware programs that are capable of detecting their environment.

Figure 12A:
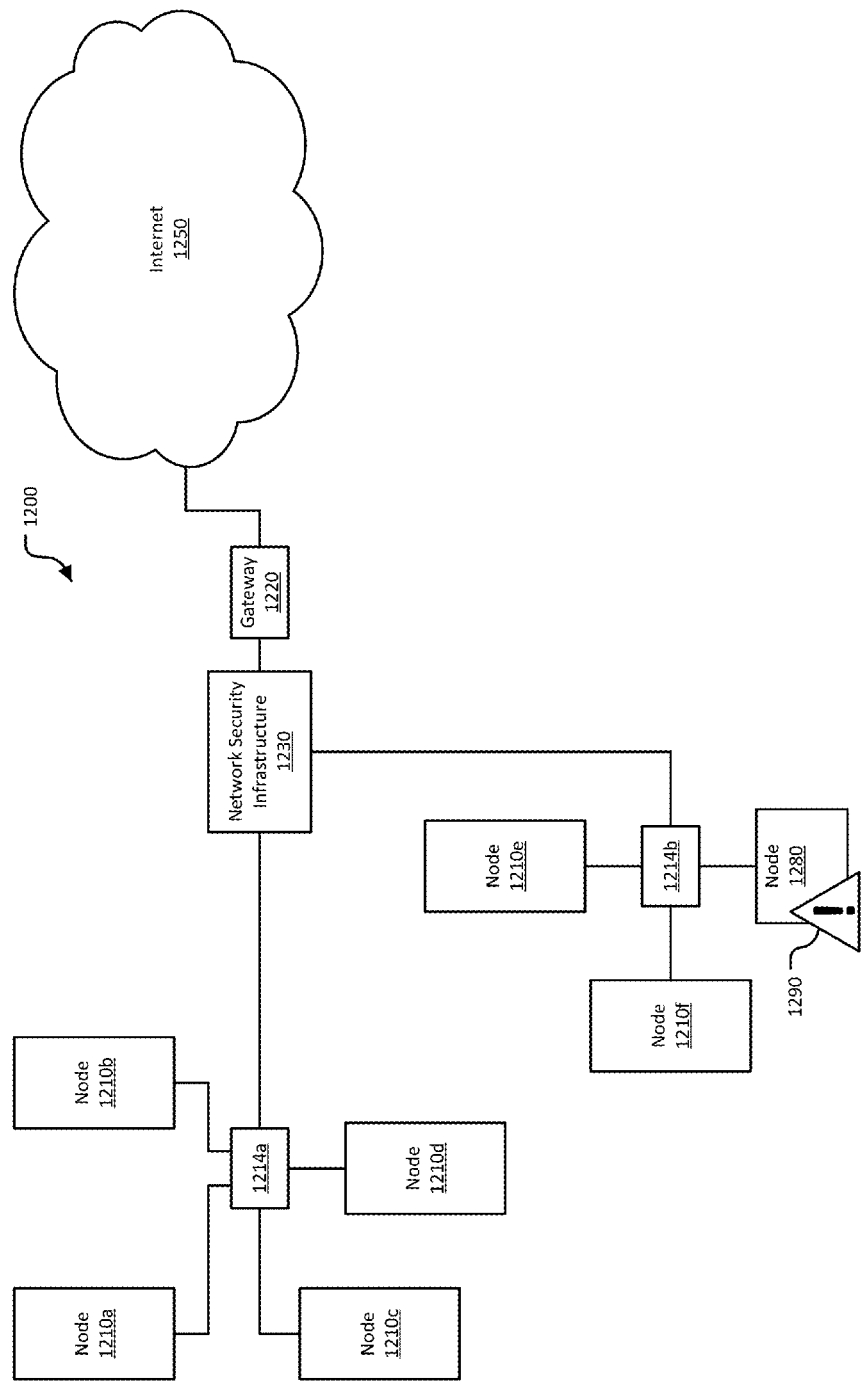
FIGS. 12A-12C illustrate an example of a network, in which cyber vaccination techniques can be implemented.
Figure 12B:
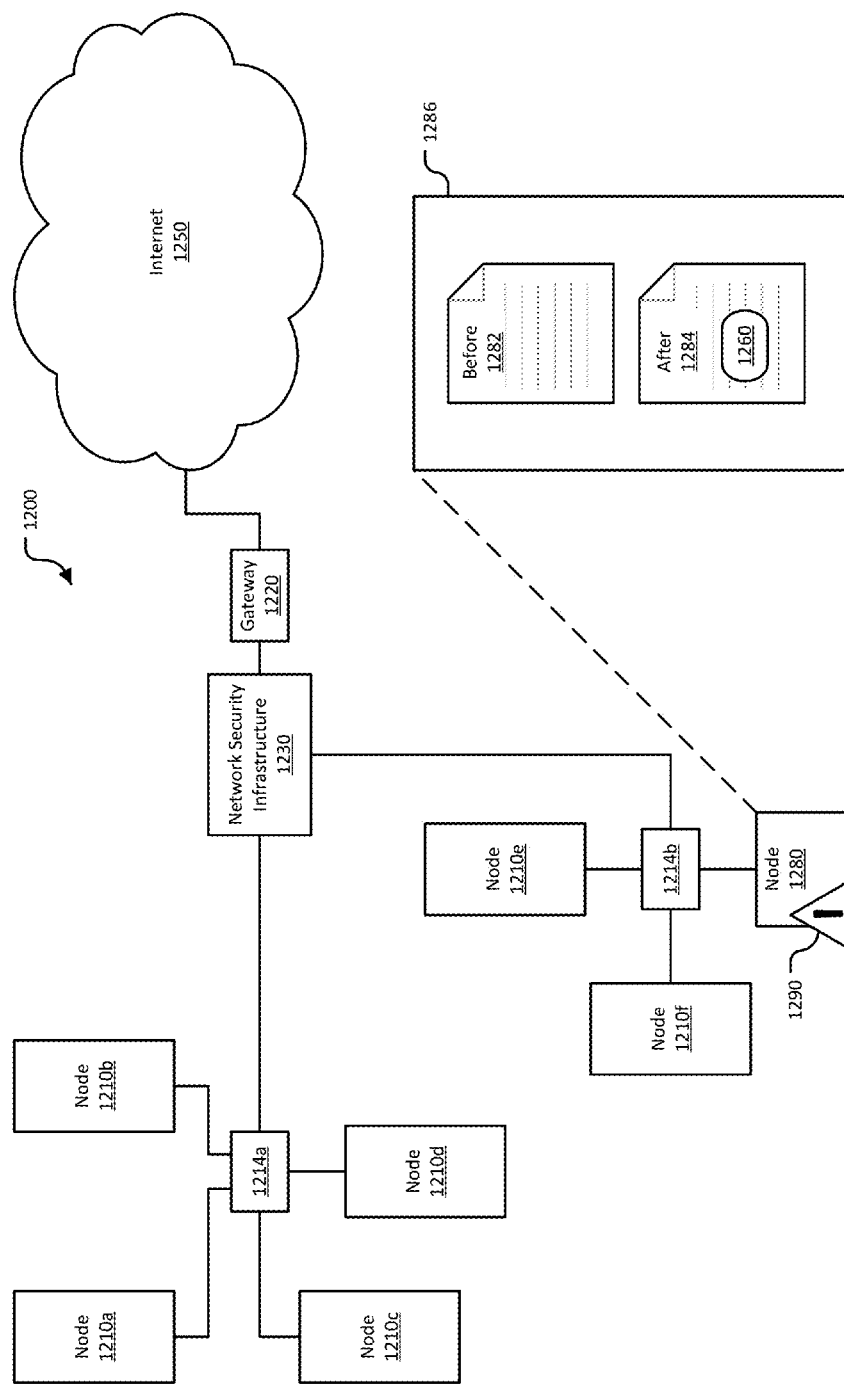
Figure 12C:
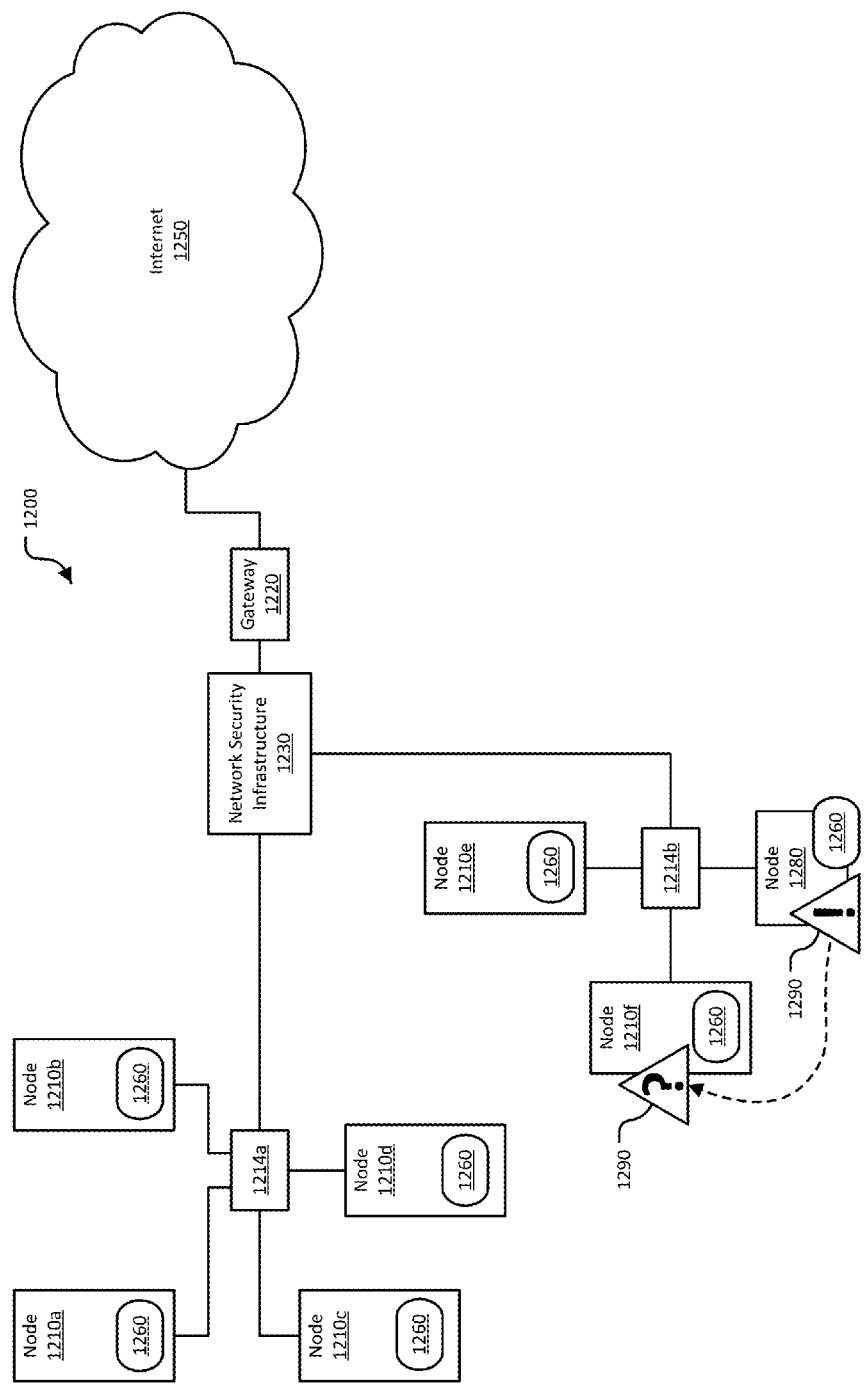

FIGS. 12A-12C illustrate an example of a network 1200, in which cyber vaccination techniques can be implemented. The example network 1200 includes a number of nodes 1210a-1210f, 1280, connected to a number of network infrastructure devices 1214a, 1214b. The example network 1200 further includes a network security infrastructure 1230, and a gateway device 1220, through which the network 1200 can connect to other networks, including the Internet 1250.

The network nodes 1210a-1210f, 1280 can include a variety of devices. For example, the network nodes 1210a-1210f, 1280 can include computing systems, such as server computers, laptop computers, desktop computers, smart phones, personal digital assistants, tablet computers, and so on. As another example, the network nodes 1210a-1210f, 1280 can include peripheral devices, such as printers and monitors, among others. As another example, the network nodes 1210a-1210f, 1280 can include storage arrays and compute farms, among other things. As another example, the network nodes 1210a-1210f, 1280 can include other systems that can be connected to a network, such as entertainment systems, televisions, home appliances, factory machinery, and so on.

The network infrastructure devices 1214a, 1214b include devices that provide network connectivity. For example, the network infrastructure devices 1214a, 1214b can include routers, switches, hubs, repeaters, access points, and network monitors, among other things. The gateway device 1220 is another example of a network infrastructure device. Examples of gateway devices include modems, access points, and devices that combine modem functionality with routing or switching functionality.

The network security infrastructure 1230 includes hardware and software that defends the network 1200 from internal and/or external threats. For example, the network security infrastructure 1230 can include anti-virus tools, email filtering tools, firewalls, security information and event management (STEM) tools, intrusion detection systems (IDSs), intrusion prevention systems (IPSs), and so on. In some implementations, the gateway device 1220 can alternatively or additionally include a firewall, or similar security tool. In many cases, the nodes 1210a-1210f, 1280 in the network 1200 also includes network security tools, such as virus scanners and email filters. Frequently, however, a network also includes network security measures at the "perimeter" of the network; that is, where the network connects to other networks, particularly public networks such as the Internet 1250.

In the example illustrated by FIG. 12A, a node 1280 has become infected with a malware program 1290. In various implementations, the node 1280 can include network security tools that can detect that the node 1280 has become infected. For example, scans by anti-virus tools and/or host intrusion detection systems can detect the presence of a virus or worm or similar malware. As another example, real-time system monitors may detect abnormal activity, such as parts of the file system becoming inaccessible due to ransomware encrypting files or other malware corrupting files. As another example, system monitors can detect unusually high activity, such as excessive processor or memory usage by an unknown or untrusted process. As another example, automated tools can examine event logs generated by the node's 1280 operating system and any applications running on the node 1280.

Once the node 1280 has determined that it has become infected with the malware program 1290, in various implementations the node 1280 can execute processes to identify a marker generated by the malware program 1290. Some malware avoids infecting the same computing system more than once. For example, ransomware can operate by encrypting the data on a computing system, which the distributor of the ransomware will unencrypt upon being paid a ransom. Should the computing system be infected twice—such that the already encrypted data is encrypted again—the computing system's data may be unrecoverable, rendering the ransom request moot.

Malware such as ransomware may thus leave a marker on a computing system, which the malware can use to identify a system that the malware has already infected. The marker can take various forms. For example, a marker can be an entry placed in a system registry (e.g., a Windows® registry) or a similar database, one or more files or directories placed in the file system, a process running at the application or kernel level, a user account activated on the system, data placed in system memory, and/or an open network port that was not previously open. In some cases, the marker is static, while in other cases the marker temporary; for example, the marker may expire and disappear naturally (e.g., a process that terminates), the marker may be self-deleting, the marker may be deleted by the malware program, the marker may be deleted by normal operation of the operating system, and so on.

FIG. 12B illustrates an example of a technique for locating and identifying a marker 1260 placed on the node 1280 by the malware program 1290. In various implementations, the node 1280 may be configured to periodically produce snapshots 1286. A snapshot can capture the current state of the node 1280, including for example processing executing at the time the snapshot was taken, the contents of system memory at the time the snapshot was taken, the contents and structure of the file system, a configuration of the hardware, the contents of a system registry, the status of any user accounts currently active on the system, and so on. The node 1280 may be configured to periodically produce snapshots as backups of the node 1280, for performance analysis, and/or for security analysis.

In the illustrated example, a process executing on the node 1280 can use snapshots 1286 of the system to locate and identify the malware program's 1290 marker 1260. For example, the process can identify a "before" snapshot 1282, that is, a snapshot taken before the malware program 1290 infected the node 1280. The process can further identify an "after" snapshot 1284, that is, a snapshot taken after the malware infection started. In various implementations, the after snapshot 1284 can be taken when a particular event occurs, such as the when the malware program 1290 completes a task (e.g., encrypting an entire file system, sending data to the Internet, copying itself to another system, etc.). In these implementations, Intermediate changes made by the malware program 1290 can be excluded from consideration as the marker.

Once the after snapshot 1284 has been obtained, the process can further compare the before snapshot 1282 to the after snapshot 1284, and identify differences. Many of the differences can be legitimate and can be ignored. For example, processes initiated by trusted operations, files generated by legitimate uses, and/or other creation or removal of data that occurs during ordinary operation of the node 1280 can be ignored. By process of elimination, the marker 1260 can be located and identified.

Alternatively or additionally, the marker 1260 can be located by looking for unexpected or unknown data, data that cannot be verified, and/or data that cannot be associated with a valid or trusted process. For example, the process executing on the node 1280 can look for unknown or unidentifiable processes, files or directories with unusual names, user accounts for nonexistent users, changes to memory or files that should not occur, and so on. In some implementations, a set of differences between the before snapshot 1282 and the after snapshot 1284 can be identified, without determining precisely which of the differences are the marker 1260. In these implementations, at least one of these differences is assumed to be the marker 1260, and the entire set of differences may be distributed as the marker 1260.

In various implementations, the marker 1260 can be a set of changes observed in the after snapshot 1284. In these implementations, all additions and/or modifications to the file system, file system registry, new processes launched, and/or newly created mutex (a program object that allows multiple program threads to share a same resource) can, together, be considered the marker 1260. By including all the additions and/or modifications, the system need not identify precisely which addition or modification is being used as the marker. In various implementations, the set of changes can be reduced by removing common operations, such as may be routinely conducted by the operating system, and/or operations known to be safe. In various implementations, some changes may not be included in the set, to avoid changes to other nodes 1210a-1210f that may be undesirable. For example, software uninstalls, termination of processes, loading of certain dynamic link libraries (DLL) may be excluded from the set.

Identification of the marker 1260 generally occurs in real time. "Real time," in this context, means that analysis of the snapshots 1286 can occur in milliseconds, so that the result of the analysis (e.g., location and identification of the marker) is available virtually immediately. The marker 1260 can thus be determined very quickly after infection by the malware program 1290 is detected. As discussed further below, the marker 1260 further be used to quickly vaccinate other network nodes 1210a-1210f against the malware program 1290.

In various implementations, analysis of the malware program 1290 can terminate once the marker 1260 has been identified. In some cases, other network security tools may analyze the malware program 1290, including for example to reverse engineer the malware, generate a digital signature, determine the behavior of the malware, or to otherwise conduct a deep analysis of the operation of the malware. While such analysis can be useful for preventing future attacks, for purposes of the cyber vaccination technique illustrated in FIGS. 12A-12C, this analysis is not necessary, and can be bypassed.

Instead, the identified marker 1260 can be used to "vaccinate" the nodes 1210a-1210f in the network. In medical terms, a vaccine can confer immunity from a particular disease. FIG. 12C illustrates an example where the marker 1260 generated by the malware program 1290 has been distributed to each of the un-infected nodes 1210a-1210f in the network 1200. Specifically, a process executing on the node 1280 can, as soon as the marker 1260 is identified, distribute a copy of the marker 1260 to each of the un-infected nodes 1210a-1210f. In various implementations, distributing the marker 1260 can be accomplished using remote administration tools, such as Windows Management Interface, PowerShell, PsTools, and Active Directory Group Policy Objects, among others. Alternatively or additionally, the marker 1260 can be distributed using enterprise endpoint detection and response agents.

In some implementations, the process can identify any nodes 1210a-1210f in the network 1200 that are to receive the marker 1260. For example, the process can be configured to distribute the marker 1260 specifically to nodes that have not yet been infected. As another example, a set of nodes may be designated for receiving the marker 1260, while other nodes are not to receive the marker 1260. In this example, these other nodes may be particularly secure, particularly sensitive, not configured to accept the marker 1260, not have the same hardware and/or software configuration as the infected node 1280, may not be susceptible to this particular malware program 1290, or for some other reason will not make use of the marker 1260. Alternatively, in some implementations, the process may be configured to automatically distribute the marker 1260 to all nodes 1210a-1210f in the network 1200. In these implementations, each node 1210a-1210f may individually determine what to do with the marker 1260.

In various implementations, when a node 1210a-1210f receives a copy of the marker 1260, the node 1210a-1210f can place the marker 1260 in the same or similar location as where the marker 1260 was found on the infected node 1280. For example, the node 1210a-1210f can place a similar entry in a system registry, place a file in a similar directory, launch a similar process, and/or create a similar user account. In cases where the marker 1260 is not static the node 1210a-1210f can periodically refresh the marker 1260 (e.g., by restarting the process, recreating a file or user account, etc.).

With the marker 1260 in place on the un-infected nodes 1210a-1210f, the nodes 1210a-1210f may be immunized from the malware program 1290. For example, should the malware program 1290 migrate from the infected node 1280 to another node 1210f, the malware program 1290 may find that the second node 1210f already has the marker 1260. The malware program 1290 may thus incorrectly determine that the second node 1210f was already infected by the malware program 1290. Based on this determination, the malware program 1290 may not activate. Thus, even though the malware program 1290 managed to spread, the effect of the malware program 1290 may have been prevented. In some cases, when the malware program 1290 does not activate, the malware program 1290 potentially also does not spread further. In these cases, the presence of the marker 1260 on the second node 1210f had the additional benefit of containing the spread of the malware program 1290.

Distribution of the marker 1260 can also occur in real time. For example, automated processes at the node 1280 can activate, once the marker 1260 has been identified, to send copies of the marker 1260 to other nodes 1210a-1210f in the network 1200. In some implementations, these automated processes can remotely configure the other nodes 1210a-1210f to place a copy of the marker 1260 on the nodes 1210a-1210f. In some implementations, these automated processes can provide a copy of the marker 1260 to each node 1210a-1210f, and the nodes 1210a-1210f can include processes for placing a copy of the marker 1260 in the appropriate location. Alternatively, a node 1210a-1210f can be configured to ignore the marker 1260.

Because the determination and distribution of the marker 1260 can occur in real time, generally, once the node 1280 determines that it has become infected with the malware program 1290, the entire network 1200 can be immunized against the malware program 1290 very quickly, potentially faster than the malware program 1290 is able to spread itself. Furthermore, lengthy analysis of the functionality of the malware program 1290 is not needed and can be left for later. The cyber-vaccination technique, as discussed above, can thus provide protection against malware infections, including zero-day malware.

Figure 13:
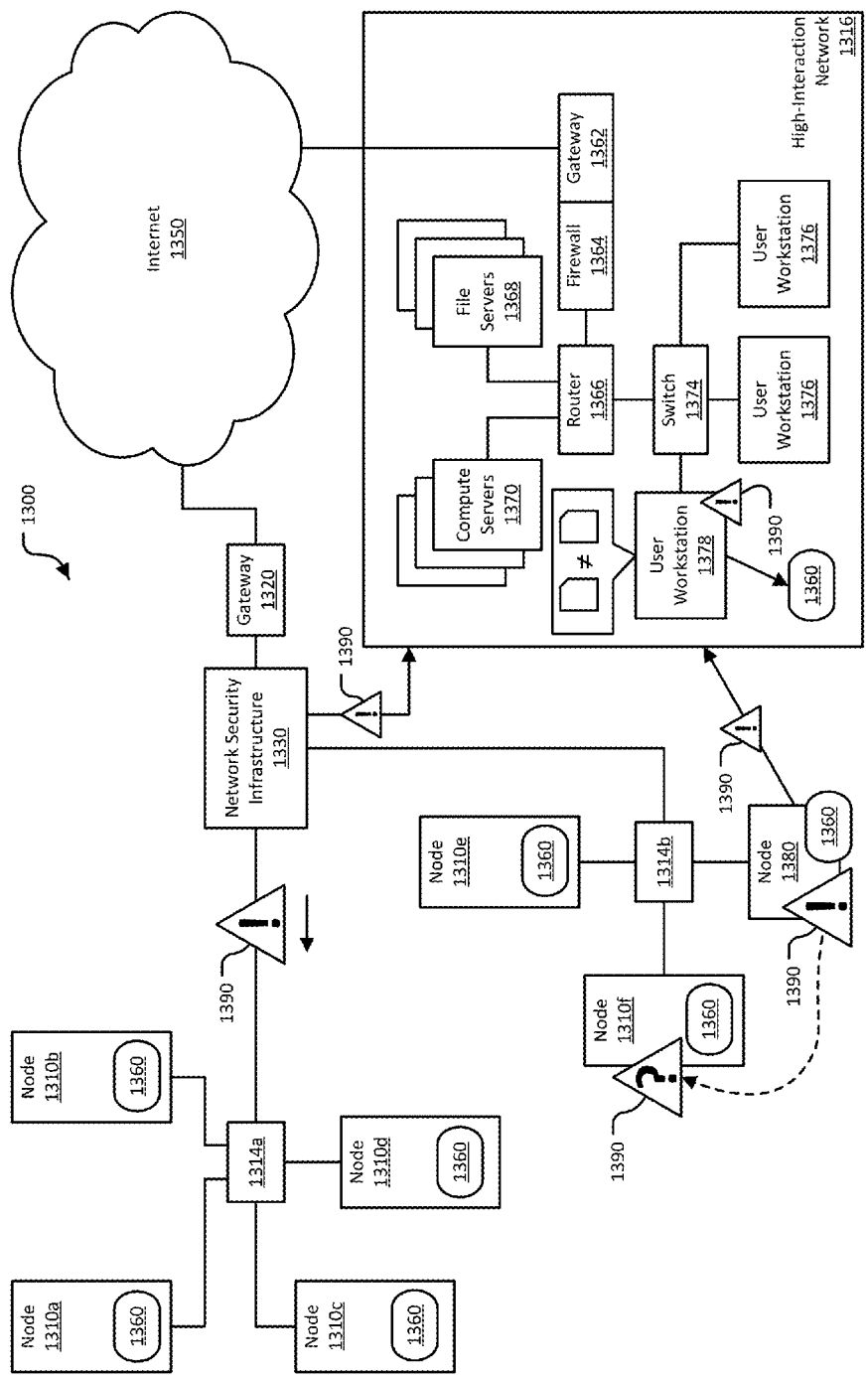
FIG. 13 illustrates another example of a network in which cyber vaccination techniques can be implemented.

FIG. 13 illustrates another example of a network 1300 in which cyber vaccination techniques can be implemented. The example network 1300 includes a number of nodes 1310a-1310f, 1380, connected to a number of network infrastructure devices 1314a, 1314b. The nodes 1310a-1310f can be one of a variety of network devices, such as computing systems, storage arrays, peripheral devices, and so on. The nodes 1310a-1310f can also be a variety of devices capable of being connected to a network, such as televisions, home appliances, manufacturing equipment, and so on. The network infrastructure devices 1314a, 1314b can include a variety of devices that provide network connectivity, such as routers, switches, hubs, repeaters, access points, and so on. The example network 1300 further includes a network security infrastructure 1330, which can include various network security tools for defending the network 1300 from threats. The example network also includes a gateway 1320, through which the network 1300 can communicate with other networks, including the Internet 1350.

In the illustrated example, the network 1300 also includes a high-interaction network 1316. The high-interaction network 1316 is a self-contained, carefully monitored environment. The high-interaction network 1316 can include physical and virtual computing systems, which can be rapidly reconfigured to emulate all or part of the network 1300, or some other network. In the illustrated example, the high-interaction network 1316 has been configured to include an array of compute servers 1370, an array of file servers 1368, and a number of user workstations 1376, 1378. The example high-interaction network 1316 further includes a switch 1374 and a router 1366 that connect the various servers 1368, 1370 and workstations 1376, 1378 together. The high-interaction network 1316 further includes a firewall 1364, which can serve to make the high-interaction network 1316 appear more like a real network. The high-interaction network 1316 further includes a gateway 1362, through which the network emulated within the high-interaction network 1316 can communicate with other networks, including the Internet 1350.

In the example of FIG. 13, the node 1380 has become infected with a malware program 1390. In various implementations, the node 1380 can include processes that can identify unusual or malicious behavior on the node 1380, which can indicate the infection by the malware program 1390. For example, the node 1380 can include anti-virus or similar tools. In various implementations, once it has been determined that the node 1380 has become infected by the malware program 1390, processes running on the node 1380 can send the malware program 1390 to the high-interaction network 1316 for analysis. Alternatively or additionally, in some implementations, processes executing on the node 1380 and/or in the network security infrastructure 1330, and/or in the network's 1300 infrastructure can isolate the node 1380. In these implementations, any further communication between the node 1380 and the rest of the network 1300 or the Internet 1350 can be redirected to the high-interaction network 1316 for analysis.

In some implementations, the malware program 1390, or data associated with the malware program 1390, may be identified by the network security infrastructure 1330. For example, the network security infrastructure 1330 may identify questionable network traffic originating from outside or inside the network 1300. In some cases, the questionable network traffic includes known malware. In some cases, the network traffic exhibits behavior and/or data patterns often associated with malware infiltrations or attempted infiltrations. In each of these cases, the network security infrastructure 1330 can be configured to redirect the questionable network traffic to the high-interaction network 1316.

As noted above, the high-interaction network 1316 is isolated from the network 1300. Thus, suspect network traffic, which may include the malware program 1390, can be sent into the high-interaction network 1316, and be activated. For example, in the illustrated example, the malware program 1390 has been activated on a user workstation 1378. Because the high-interaction network 1316 is configured to emulate a physical network, the malware program 1390 can function as designed, and do whatever what is intended.

As also noted above, the high-interaction network 1316 can closely monitor the behavior of the malware program 1390. For purposes of vaccinating the network 1300, however, the high-interaction network 1316 can be configured to quickly identify changes made to the user workstation 1378 by the malware program 1390, and locate a marker 1360 generated by the malware program 1390. For example, the high-interaction network 1316 can take a snapshot of the user workstation 1378 before the malware program 1390 is activated and take a snapshot after the malware program 1390 is activated. By comparing these snapshots, the high-interaction network 1316 can identify changes made to the user workstation 1378 by the malware program 1390. Changes such as file overwrites (such as, for example, overwrites caused by ransomware encrypting files), registry overwrites, and other changes related to the harm intended by the malware program 1390 can be ignored. Similarly, in some implementations, deletion of registry entries, changes to sensitive registry entries (such as those related to security, backup, restore, and/or anti-virus software), file system deletion or updates of application software such as anti-virus software, changes to operating system directory, loading of certain DLLs, changes to some environment variables, and/or new task schedulers may also be excluded.

Once the marker 1360 used by the malware program 1390 has been identified, the high-interaction network 1316 can cause the marker 1360 to be distributed to the nodes 1310a-1310f in the network 1300. The high-interaction network 1316 can be configured with a list of particular nodes 1310a-1310f that should receive the marker 1360, or the high-interaction network 1316 can be configured to send the marker 1360 to all the nodes 1310a-1310f in the network 1300. The high-interaction network 1316 can, for example, use remote administration tools to send copies of the marker 1360 to the nodes 1310-1310f in the network 1300. In some implementations, the high-interaction network 1316 can place a copy of the marker 1360 in the appropriate location on a node 1310a-1310f. In some implementations, the high-interaction network 1316 can provide a copy of the marker 1360 to a node 1310a-1310f, and the node 1310-1310f can itself determine what to do with the marker 1360.

Once the marker 1360 has been distributed across the network 1300, should the malware program 1390 spread to another node 1310f, or infiltrate the network 1300 again, each of the nodes 1310a-1310f that have a copy of the marker 1360 may be immunized form the malware program 1390. For example, should the malware program 1390 migrate to a particular node 1310f, the malware program 1390 may find the marker 1360, and determine not to activate.

Generally, identification and distribution of the marker 1360 occurs automatically and in real-time. For example, the high-interaction network 1316 can be configured to automatically trigger the malware program 1390. The high-interaction network 1316 can further automatically execute steps that can identify the marker 1360, and automatically distribute the marker 1360 once the marker 1360 has been identified. Because each of these processes is automated, vaccination of the network 1300 against the malware program 1390 can occur rapidly after the malware program 1390 has been triggered.

In various implementations, the high-interaction network 1316 need only to conduct sufficient analysis to identify the marker 1360. In some cases, the high-interaction network 1316 can conduct further analysis into the malware program 1390. In these cases, the high-interaction network 1316 can generate a digital signature for the malware program 1390, and/or various indicators that can be used to identify the malware program 1390.

Figure 14A:
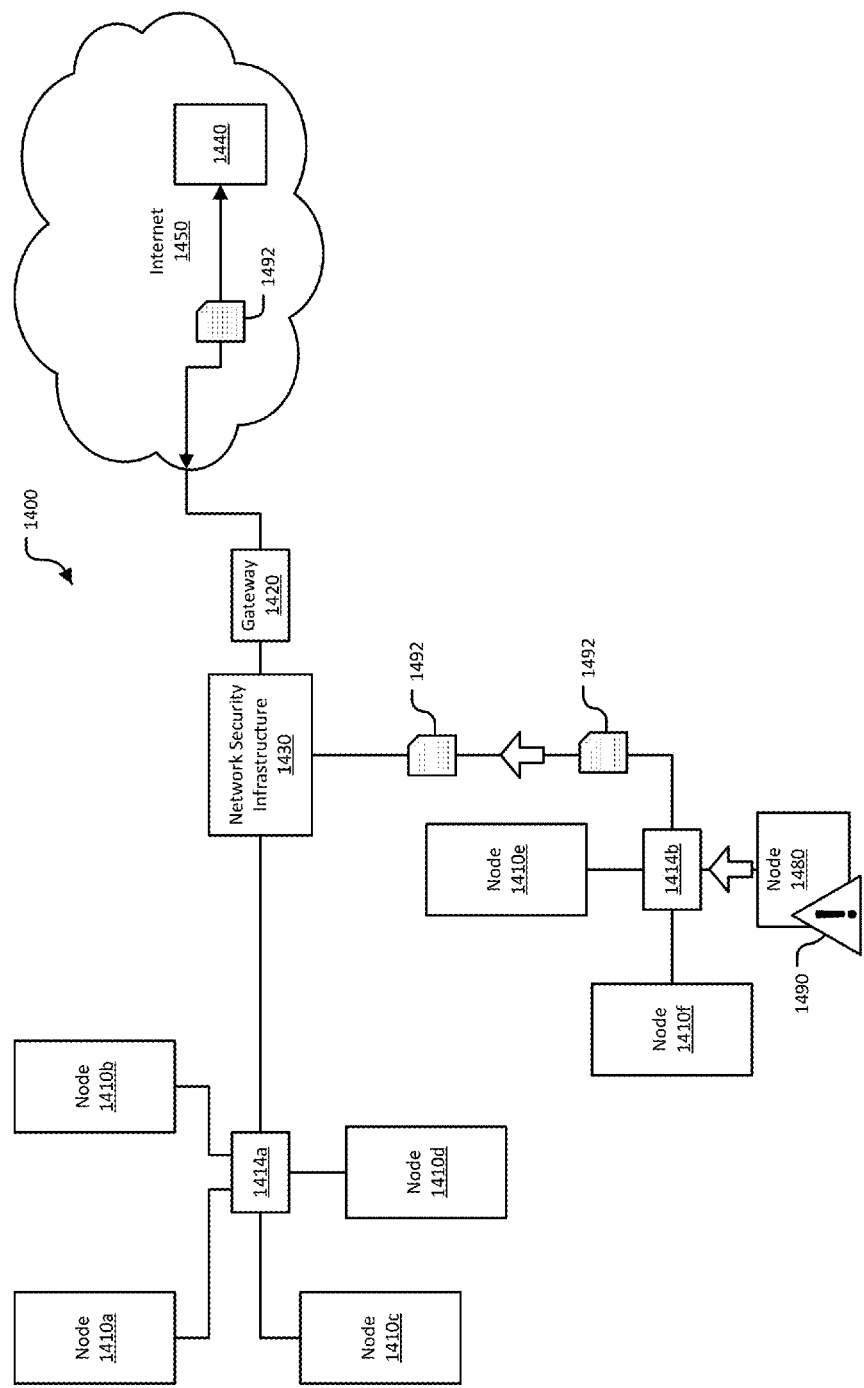
FIGS. 14A-14C illustrate an example of a network, in which cyber antibody techniques can be implemented.
Figure 14B:
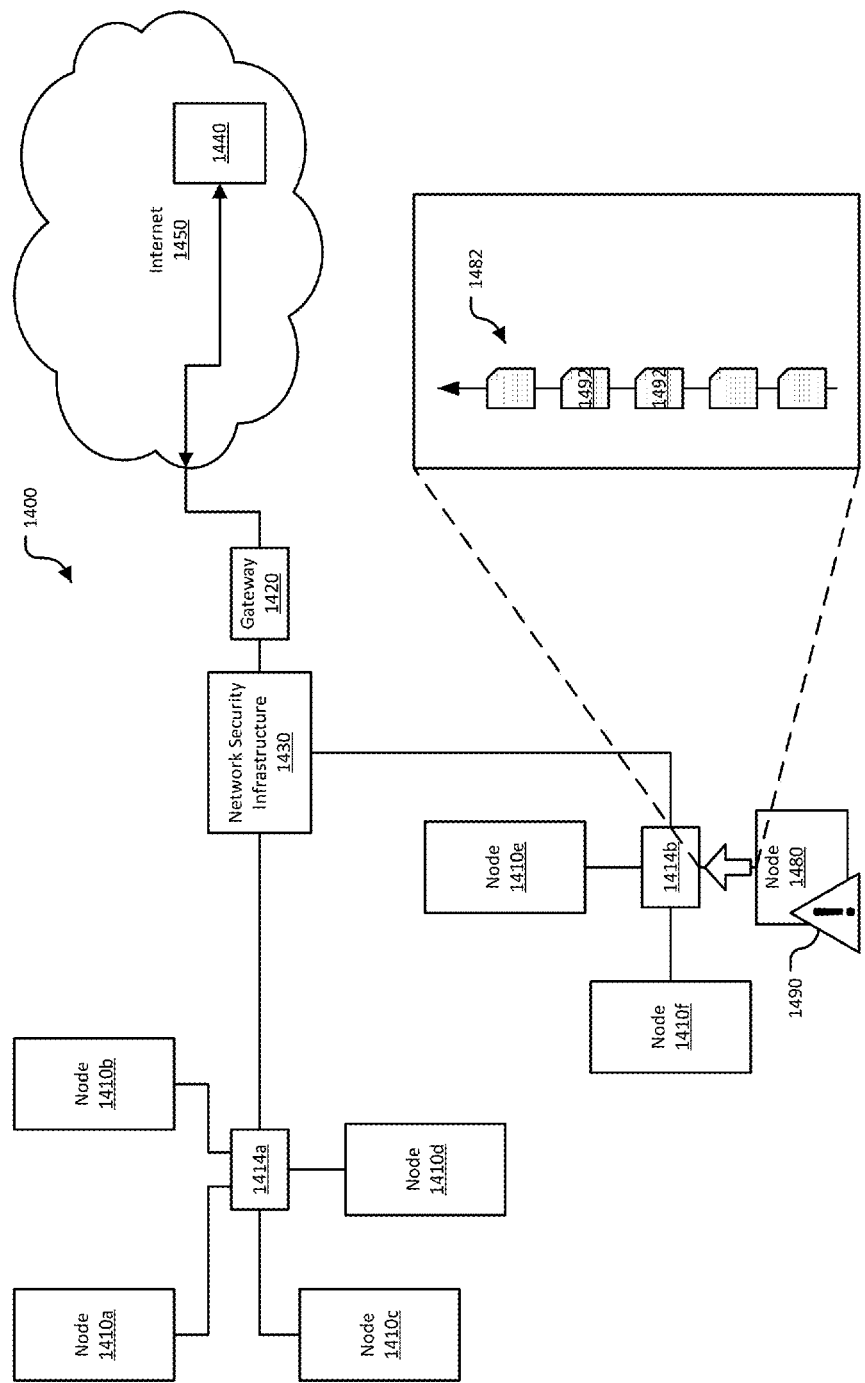
Figure 14C:
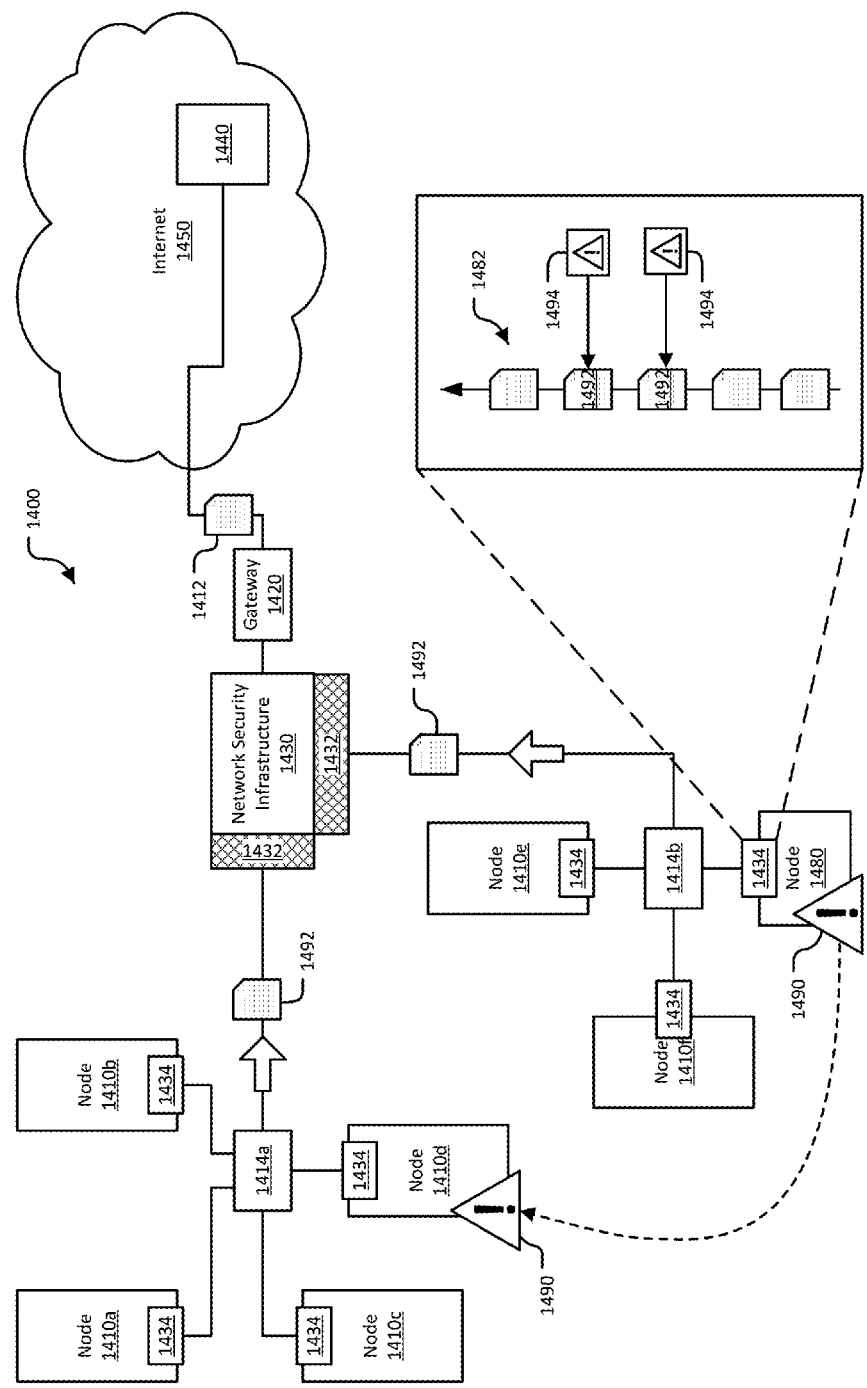

FIGS. 14A-14C illustrate an example of a network 1400, in which cyber antibody techniques can be implemented. The example network 1400 includes a number of nodes 1410a-1410f, 1480, connected to a number of network infrastructure devices 1414a, 1414b. The nodes 1410a-1410f can be one of a variety of network devices, such as computing systems, storage arrays, peripheral devices, and so on. The nodes 1410a-1410f can also be a variety of devices capable of being connected to a network, such as televisions, home appliances, manufacturing equipment, and so on. the network infrastructure devices 1414a, 1414b can include a variety of devices that provide network connectivity, such as routers, switches, hubs, repeaters, access points, and so on. The example network 1400 further includes a network security infrastructure 1430, which can include various network security tools for defending the network 1400 from threats. The example network also includes a gateway 1420, through which the network 1400 can communicate with other networks, including the Internet 1450.

In the example of FIG. 14A, a node 1480 has become infected with a malware program 1490. In various implementations, the node 1480 can include network security tools that can detect that the node 1480 has become infected. For example, routine scans by anti-virus tools can detect the presence of a virus or worm or similar malware. As another example, real-time system monitors may detect abnormal activity, such as parts of the file system becoming inaccessible due to ransomware encrypting files or other malware corrupting files. As another example, system monitors can detect unusually high activity, such as excessive processor or memory usage by an unknown or untrusted process.

Once the node 1480 has determined that it has become infected with the malware program 1490, in various implementations the node 1480 can execute processes to identify network packets 1492 sent by the malware program 1490. Some malware programs establish a communication channel with the computer systems of an outside entity, which will be referred to herein as a malicious actor 1440. The malicious actor 1440 may be located somewhere on the Internet 1450. In some cases, the malicious actor 1440 may be within the network 1400. For example, the malicious actor 1440 may be using a compromised node in the network 1400. The malware program 1490 may use the communication channel, for example, to receive instructions or commands from the malicious actor 1440, or other data such as security keys or malicious programs. As another example, the malware program 1490 may be sending status updates to the malicious actor 1440; for example, a ransomware program may communicate a percentage of the node's 1480 file system that has been encrypted. As another example, the malware program 1490 may be providing information to the malicious actor 1440, such as authentication information that opens a backdoor. As another example, the malware program 1490 may be stealing data (e.g., passwords, credit card numbers, etc.) from the network 1400, and sending this data to the malicious actor 1440.

In some cases, blocking the malware program's 1490 communication channel can be accomplished by identifying the destination address or target domain to which the malware program 1490 is sending packets 1492. In some cases, however, the packets 1492 from the malware program 1490 may addressed to legitimate domains or addresses. For example, the packets 1492 may take the form of posts to social media sites, such as Facebook® or Twitter®. As another example, the packets 1492 may include posts to public forums such as Quora® or Yahoo Answers. In these cases, the malicious actor 1440 can obtain the information contained in the packets 1492 by monitoring these sites in a legitimate fashion, using valid accounts. In these examples, blocking all network traffic from the network 1400 to these sites can block legitimate traffic, in addition to the packets 1492 sent by the malware program 1490.

In other cases, the malware program 1490 may communicate with the malicious actor 1440 through convoluted paths. For example, the malicious actor 1440 may be using proxies, "onion" routers, multi-stage exfiltration, and so on. As another example, the malware program 1490 may be communicating with a changing list of destinations, each of which may disappear as soon as the packets 1492 are received. In these cases, blocking network traffic from the network 1400 to any one destination may not be sufficient.

In various implementations, a cyber antibody technique can be used to block the packets 1492 from the malware program 1490 without needing to block particular destination addresses or whole domains. A cyber antibody technique includes identifying packets sent by the malware program 1490, and then "tainting" or modifying these packets 1492 so that the packets 1492 are blocked by the network security infrastructure 1430.

FIG. 14B illustrates an example of the first stage of the cyber antibody technique. In the illustrated example, processes running on the node 1480 can monitor the packet stream 1482 originating from the node 1480. The processes can further identify the packets 1492 associated with the malware program 1490. Specifically, each process on the node 1480 that generates packets can be monitored, and packets from any known, trusted, or verifiable process can be ignored. In some implementations, Hypertext Transfer Protocol (HTTP) requests to retrieve data (e.g., GET requests) may also be ignored. Packets from any unknown, untrusted, or unverifiable processes, or any process that can be identified as possibly associated with the malware program 1490 can be identified as suspect packets. For example, HTTP requests to send data to a website (e.g., POST requests) can be suspect. For example, HTTP POST request can be used to exfiltrate data out of the network 1400. As another example, Domain Name Server (DNS) requests can be used to create illicit DNS tunnels by attaching special characteristics to DNS requests. In some implementations, all of the suspect packets are assumed to be packets that should be blocked. In some implementations, the suspect packets can be further filtered to identify the specific packets that are originating from the malware program 1490.

Once the packets 1492 to be blocked have been identified, processes running on the node 1480 can further determine identifying characteristics for the packets 1492. Characteristics of the packets 1492 can include, for example, a process that generated the packets 1492. As another example, characteristics can include fields in a header portion of the packets, such as for example a source address, a destination address, a network protocol type, an identification, and/or a label. As another example, characteristics can include data found in a payload portion of the packets 1492, such as hashtags, random character strings, formatted character strings, text formatted using foreign character encodings, and so on. In some cases, text such as hashtags and/or formatted character strings are used by the malicious actor 1440 to locate the packets 1492 once the packets 1492 are on the Internet 1450.

The node 1480 can thereafter use the characteristics to identify further packets 1492 from the malware program 1490. These identified packets 1492 can then be "tainted." As illustrated in FIG. 14C, the node 1480 can include a tool, process, or filter 1434 through which packets from the node 1480 pass before being placed on the network 1400. The filter 1434 can identify packets 1492 from the malware program 1490, and "taint" these packets 1492 by inserted data associated with a known malware program 1494 into the packets 1492. The data can be, for example, an executable file, an image, a document, or some other data that has previously been identified as containing malware or being generated by malware. For example HTTP POST requests can be modified to include strings known to be used to exfiltrate data. As another example, DNS packets, including DNS text messages, Extensions mechanisms for DNS (EDNS) messages, and long DNS requests, can be modified with characteristics known to be used for DNS tunneling.

By inserting data associated with the known malware program 1494 into the packets 1492, the packets 1492 will be blocked by network traffic scanning tools 1432 that are part of the network security infrastructure 1430. Network traffic scanning tools 1432, such as firewalls, intrusion detection systems, intrusion protection systems, data loss prevention (DLP) systems, egress filtering, and others can scan outbound network traffic and block any network traffic that should not be leaving the network 1400. Such traffic can include any packets that contain identifiable malware. By tainting outbound network traffic with characteristics of known malware, the network security infrastructure's 1430 existing rules and filters can be used to block such traffic. New rules for the unknown malware program 1490 need not be generated.

The network traffic scanning tools 1432 can thus block packets 1492 that have been generated by the malware program 1490 when the packets 1492 have been modified to include data associated with a known malware program 1494. Modifying the packets 1492 can cause packets that would otherwise appear legitimate, such as posts to social media sites or forums, to appear infected. The packets 1492 are selectively modified, however, so that packets 1412 generated for legitimate purposes (e.g., by users posting to social media sites or forums) are not blocked, and can pass through the network security infrastructure 1430.

In various implementations, processes executing on the node 1480 can also distribute the characteristics that identify the packets 1492 from the malware program 1490 to other nodes 1410a-1410f in the network 1400. For example, the process can, using remote administration tools, copy the characteristics to the other nodes 1410a-1410f.

The other nodes 1410a-1401f can also include a tool, process, or filter 1434 that can use the characteristics to identify and taint packets 1492 generated by the malware program 1490, so that these packets 1492 will be blocked by the network security infrastructure 1430. In some implementations, the processes on the node 1480 can configure the filters 1434 at the other nodes 1410a-1410f using, for example, remote administration tools. In some implementations, the processes on the node 1480 can make the characteristics of the packets 1492 available to the other nodes 1410a-1410f, and the nodes 1410a-1410f can configure their respective filters 1434, or choose not to use the characteristics.

Alternatively or additionally, the process can infect the other nodes 1410a-1410f with the malware program 1490, so that the other nodes 1410a-1410f can generate packets that have the same characteristics. For example, the process can copy the malware program 1490 to the other nodes 1410a-1410f and cause the malware program 1490 to be launched. Alternatively or additionally, the process can enable paths to the other nodes 1410a-1410f that are often used by malware programs to distribute themselves. For example, some malware spreads using the file system paths that lead to other devices. Thus, the process can create file system paths, such as Server Message Block (SMB) shared directories, soft links (e.g., "shortcuts"), hard links, etc., between the infected node 1480 and the other nodes 1410a-1410f. Alternatively or additionally, some malware spreads emailing itself to email addresses found in an address book or contacts list. Thus, the process can generate email addresses for the other nodes 1410a-1410f, so that, when email is sent to these email addresses, the email will be directed to the other nodes 1410a-1410f.

The identification of the packets 1492 generated by the malware program 1490 and determination of identifying characteristics of these packets 1492 can occur in real time. Thus, the communication channel to the malicious actor 1440 can be blocked very quickly once the node 1480 has become infected. Additionally, distribution of the identifying characteristics can also occur in real time, so that other nodes 1410a-1410f in the network 1400 can also block similar communication channels, should the malware program 1490 spread to these other nodes 1410a-1410f. Deeper analysis of the packets 1492, such as their intended purpose, destination, contents, method of operation, and so on is not needed, and can be left for later. Deeper analysis of the malware program 1490, to determine, for example, the source of the malware program 1490, its intended purpose, and the nature of the harm the malware program 1490 is capable of, can also be left for later. Immediate isolation of the infected node 1480, while prudent, can also be left for later. The node 1480 can, however, in some implementations, issue alerts to network administrators to indicate the presence of the malware program 1490 and the need for action to be taken.

Figure 15:
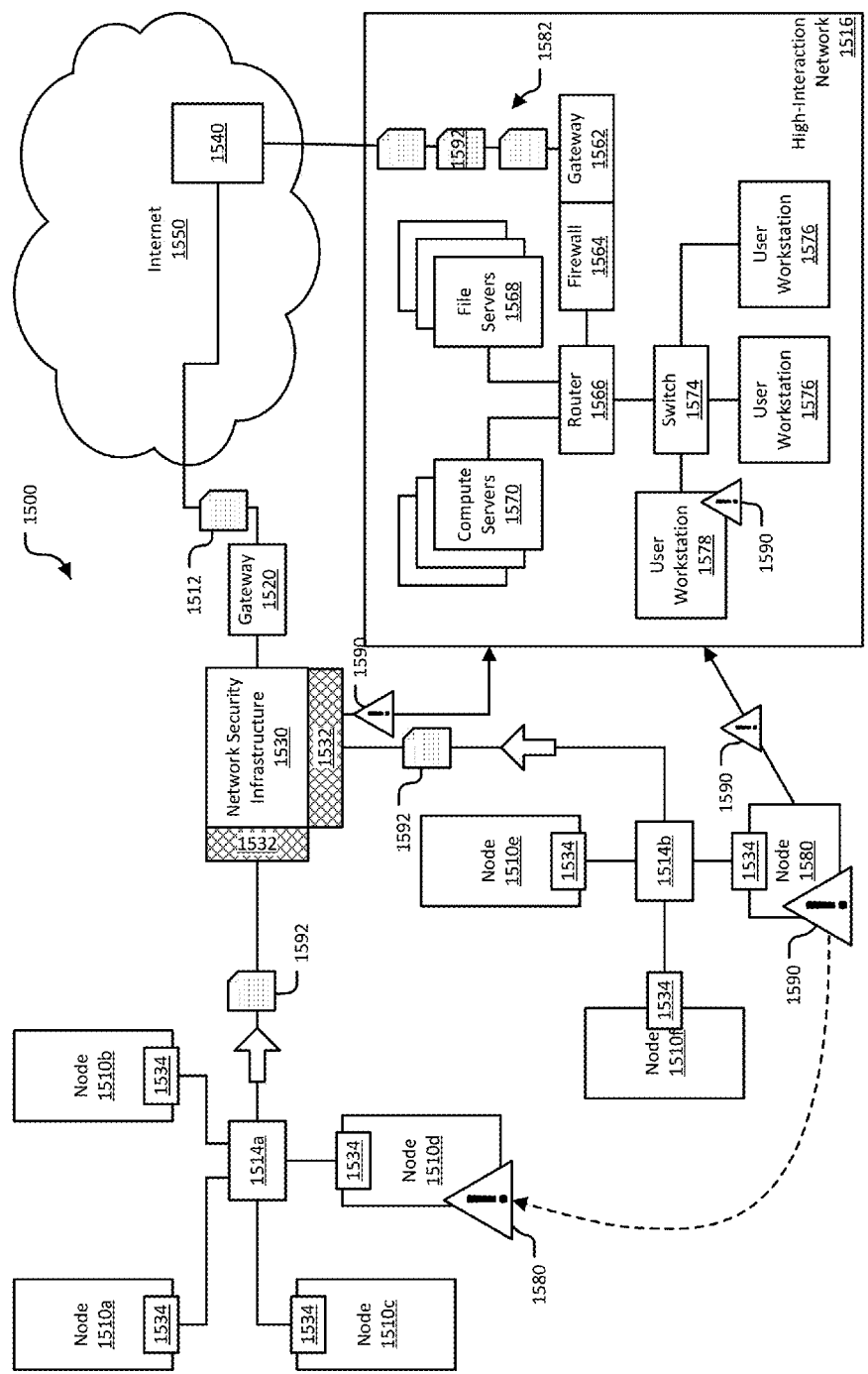
FIG. 15 illustrates another example of a network in which cyber antibody techniques can be implemented.

FIG. 15 illustrates another example of a network 1500 in which cyber antibody techniques can be implemented. The example network 1500 includes a number of nodes 1510a-1510f, 1580, connected to a number of network infrastructure devices 1514a, 1514b. The nodes 1510a-1510f can be one of a variety of network devices, such as computing systems, storage arrays, peripheral devices, and so on. The nodes 1510a-1510f can also be a variety of devices capable of being connected to a network, such as televisions, home appliances, manufacturing equipment, and so on. The network infrastructure devices 1514a, 1514b can include a variety of devices that provide network connectivity, such as routers, switches, hubs, repeaters, access points, and so on. The example network 1500 further includes a network security infrastructure 1530, which can include various network security tools for defending the network 1500 from threats. The example network also includes a gateway 1520, through which the network 1500 can communicate with other networks, including the Internet 1550.

In the illustrated example, the network 1500 also includes a high-interaction network 1516. The high-interaction network 1516 is a self-contained, carefully monitored environment, in which malware programs can be released, monitored, and studied. In the illustrated example, the high-interaction network 1516 has been configured to include an array of compute servers 1570, an array of file servers 1568, and a number of user workstations 1576, 1578. The example high-interaction network 1516 further includes a switch 1574 and a router 1566 that connect the various servers 1568, 1570 and workstations 1576, 1578 together. The high-interaction network 1516 further includes a firewall 1564, which can serve to make the high-interaction network 1516 appear more like a real network. The high-interaction network 1516 further includes a gateway 1562, through which the network emulated within the high-interaction network 1516 can communicate with other networks, including the Internet 1550.

In the example of FIG. 15, the node 1580 has become infected with a malware program 1590. In various implementations, the node 1580 can include processes that can identify unusual or malicious behavior on the node 1580, which can indicate the infection by the malware program 1590. For example, the node 1580 can include anti-virus or similar tools. In various implementations, once it has been determined that the node 1580 has become infected by the malware program 1590, processes running on the node 1580 can send the malware program 1590 to the high-interaction network 1516 for analysis. Alternatively or additionally, in some implementations, processes executing on the node 1580 and/or in the network security infrastructure 1530, and/or in the network's 1500 infrastructure can isolate the node 1580. In these implementations, any further communication between the node 1580 and the rest of the network 1500 or the Internet 1550 can be redirected to the high-interaction network 1516 for analysis.

In some implementations, the malware program 1590, or data associated with the malware program 1590, may be identified by the network security infrastructure 1530. For example, the network security infrastructure 1530 may identify questionable network traffic originating from outside or inside the network 1500. In some cases, the questionable network traffic includes known malware. In some cases, the network traffic exhibits behavior and/or data patterns often associated with malware infiltrations or attempted infiltrations. In each of these cases, the network security infrastructure 1530 can be configured redirect the questionable network traffic to the high-interaction network 1516.

As noted above, the high-interaction network 1516 is isolated from the network 1500. Thus, suspect network traffic, which may include the malware program 1590, can be sent into the high-interaction network 1516, and be activated. For example, in the illustrated example, the malware program 1590 has been activated on a user workstation 1578. Because the high-interaction network 1516 is configured to emulate a physical network, the malware program 1590 can function as designed, and do whatever harm is intended.

As also noted above, the high-interaction network 1516 can closely monitor the behavior of the malware program 1590, including watching for packets 1592 that are transmitted by the malware program 1590. For example, the high-interaction network 1516 can isolate processes associated with or spawned by the malware program 1590, and identify any packets 1592 that are generated by these processes. The high-interaction network 1516 can further determine characteristics of these packets 1592 that distinguish these packets 1592 from other packets in a packet stream 1582 leaving the high-interaction network 1516.

Because the high-interaction network 1516 is isolated from the rest of the network 1500, the packets 1592 can be allowed to reach a malicious actor 1540 located somewhere on the Internet 1550, so that the behavior of the packets 1592 and the malware program 1590 can be further analyzed.

For purposes of the cyber antibody technique, however, this further analysis is not needed, and can be left for later. Once the packets 1592 have been identified, the distinguishing characteristics of these packets 1592 can be distributed to the nodes 1510a-1510f in the network 1500. The characteristics can further be used to configure tools, processes, or filters 1534 that can use the characteristics to taint or modify packets that have similar characteristics. In some implementations, the high-interaction network 1516 can remotely configure the filters 1534 using, for example, remote administration tools. In some implementations, the high-interaction network 1516 can provide the characteristics to the nodes 1510a-1510f, which can then use the characteristics to configure the filters 1534.

Distributing the characteristics can lead to the communication channel between the malware program 1590 and the malicious actor 1540 to be cut off, even if the malware program 1590 manages to spread to other nodes 1510a-1510f in the network 1500. The operating of the malware program 1590 may thus be halted or at least contained.

Generally, analysis and identification of the packets 1592 from the malware program 1590 occurs automatically and in real time. For example, the high-interaction network 1516 can be configured to automatically trigger the malware program 1590. The high-interaction network 1516 can further automatically execute the steps to identify the packets 1592, and automatically distribute distinguishing characteristics of these packets across the network 1500. Because each of these processes is automated, preemptive blocking of the malware program 1590 communication channel can occur rapidly after the malware program has been triggered.

Figure 16:
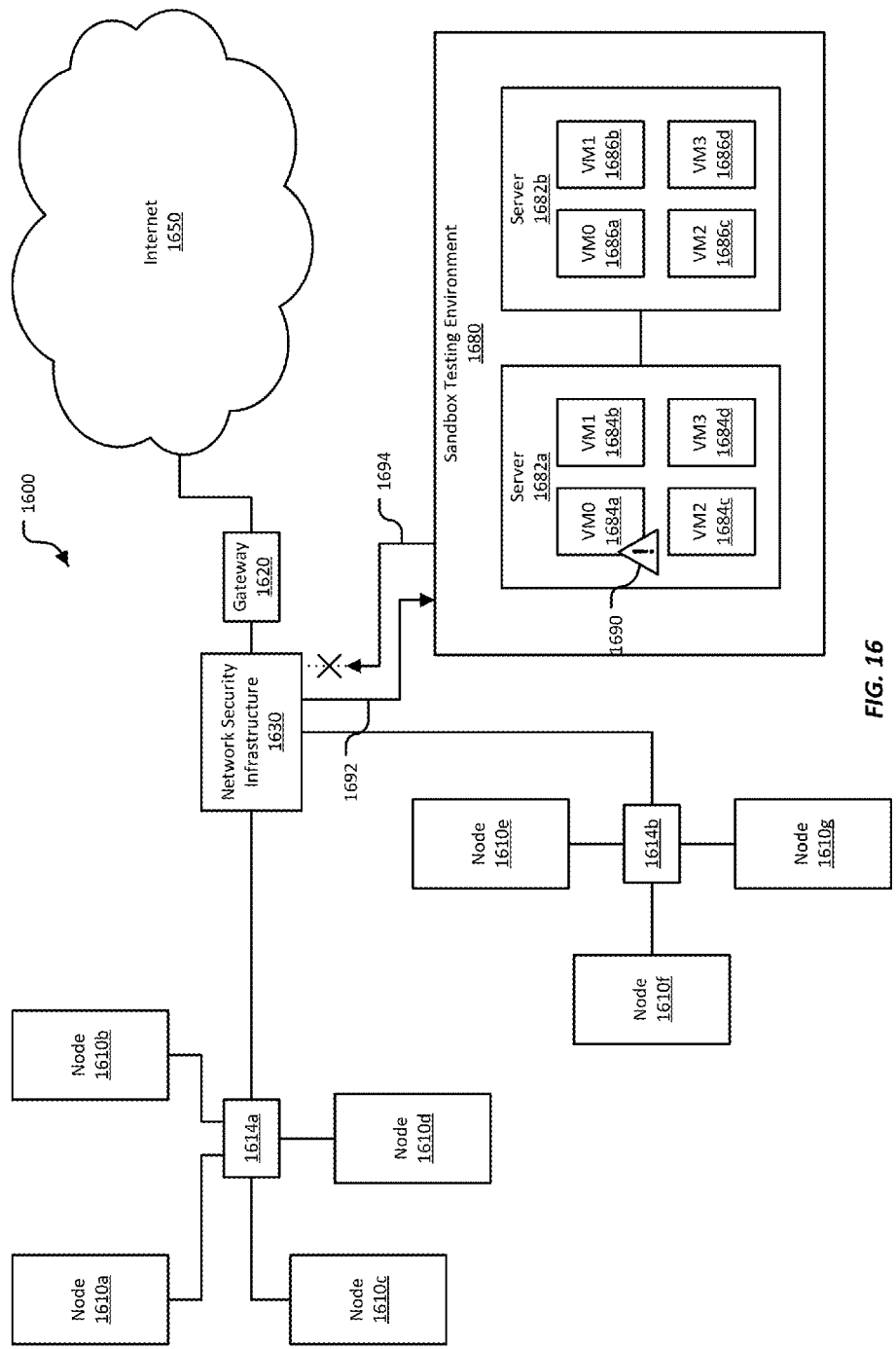
FIG. 16 illustrates an example of a network that includes a sandbox testing environment.

FIG. 16 illustrates an example of a network 1600 that includes a sandbox testing environment 1680. The example network 1600 includes a number of nodes 1610a-1610g, connected to a number of network infrastructure devices 1614a, 1614b. The nodes 1610a-1610g can be one of a variety of network devices, such as computing systems, storage arrays, peripheral devices, and so on. The nodes 1610a-1610g can also be a variety of devices capable of being connected to a network, such as televisions, home appliances, manufacturing equipment, and so on. The network infrastructure devices 1614a, 1614b can include a variety of devices that provide network connectivity, such as routers, switches, hubs, repeaters, access points, and so on. The example network 1600 further includes a network security infrastructure 1630, which can include various network security tools for defending the network 1600 from threats. The example network also includes a gateway 1620, through which the network 1600 can communicate with other networks, including the Internet 1650.

The example network 1600 further includes an example of sandbox testing environment 1680. The sandbox testing environment 1680 is a closed system in which a malware program 1690 can be tested and analyzed. A typical sandbox testing environment 1680 includes one or more servers 1682a, 1682b, each executing a number of virtual machines 1684a-1684d, 1686a-1686d. The virtual machines 1684a-1684d, 1686a-1686d can be configured to resemble production network devices, such as the nodes 1610a-1610g. Suspect data 1692, identified by the network security infrastructure 1630, can be sent to the sandbox testing environment 1680 for analysis. Often, the sandbox testing environment does not include an outbound communication channel 1694, to prevent any effects from malware that is being tested from spreading.

Virtual machines are often used in sandbox testing because virtual machines can be brought up, reconfigured, and/or shut down very quickly. Additionally, because virtual machines exist only in the memory of a host server, the operation of a virtual machine—particularly the operation of a malware program—can be closely monitored. Sandbox testing environments are often used for detailed analysis of malware programs.

Some malware programs, however, have been designed to detect that the malware program is within a sandbox testing environment. Such malware programs can avoid activating when in a sandbox testing environment, and thus thwart detection and/or analysis. Such malware programs can identify the sandbox testing environment by, for example, looking for a Media Access Control (MAC) address, which can uniquely identify a network interface. A MAC address typically includes an organizationally unique identifier, which can identify a manufacturer of the network interface. In a virtual machine, the organizationally unique identifier may identify the producer of the hypervisor, such as VMWare® or Xen®. This information can indicate to a malware program 1690 that the malware program 1690 has been released within a virtual machine.

The malware program 1690 can alternatively or additionally look for other indicators that identify the sandbox testing environment 1680. For example, the malware program 1690 can look for entries in a system registry that are associated with hypervisors or the sandbox testing environment 1680. As another example, the malware program 1690 can look for processes associated with virtual machines (e.g., processes running as part of the hypervisor) and/or with the sandbox testing environment 1680. As another example, the malware program 1690 can look for files, directories, tools, and other data associated with a hypervisor or sandbox testing environment 1680. As another example, the malware program 1690 can look at a current execution path, which may indicate that the malware program 1690 is in a virtual machine and/or in the sandbox testing environment 1680.

In some cases, the malware program 1690 can further thwart analysis in the sandbox testing environment 1680 by activating only with certain triggers. The trigger can be a timer. For example, often sandbox testing spends only a few minutes attempting to analyze a suspicious file before moving on. In this way, the sandbox testing environment 1680 can test many suspect files, in an attempt to keep up with the rate of attacks. Thus, some malware may trigger after a lapse of more than a few minutes, or after a full day, or after some other time period. As another example, some malware triggers based on events that usually do not occur in a sandbox testing environment, such as a system reboot or user interaction.

Figure 17:
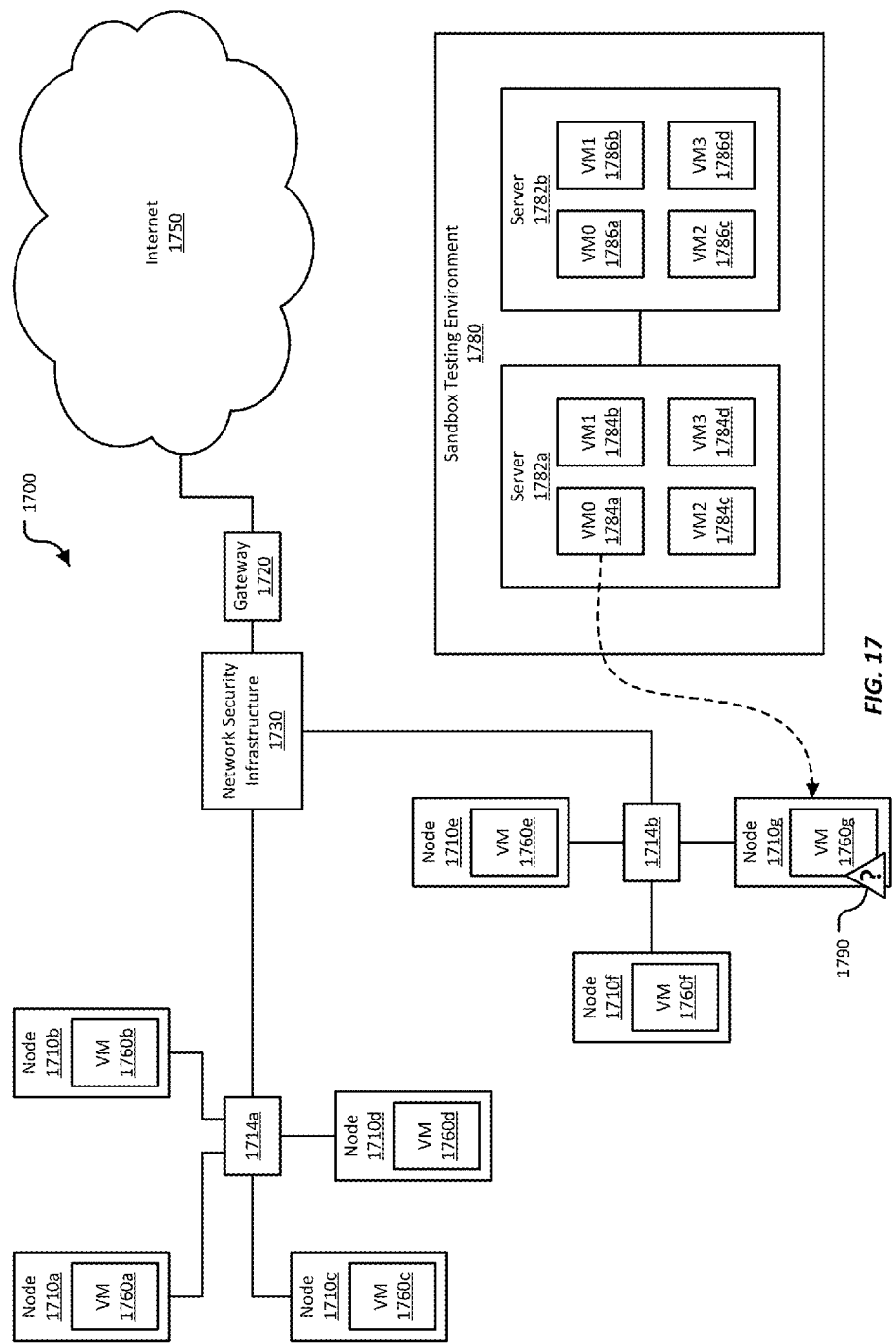
FIG. 17 illustrates an example of a generic cyber vaccination technique.

FIG. 17 illustrates an example of a generic cyber vaccination technique, in which a malware program's 1790 anti-detection efforts can be used against it. The example network 1700 includes a number of nodes 1710a-1710g, connected to a number of network infrastructure devices 1714a, 1714b. The nodes 1710a-1710g can be one of a variety of network devices, such as computing systems, storage arrays, peripheral devices, and so on. The nodes 1710a-1710g can also be a variety of devices capable of being connected to a network, such as televisions, home appliances, manufacturing equipment, and so on. The network infrastructure devices 1714a, 1714b can include a variety of devices that provide network connectivity, such as routers, switches, hubs, repeaters, access points, and so on. The example network 1700 further includes a network security infrastructure 1730, which can include various network security tools for defending the network 1700 from threats. The example network also includes a gateway 1720, through which the network 1700 can communicate with other networks, including the Internet 1750.

The nodes 1710a-1710g, in the example of FIG. 17, are production network devices. That is, the nodes 1710a-1710g are used for the normal network operations, or for whatever operations the owner of the network 1700 intends to use the network 1700. Generally, normal network operations exclude testing and analyzing malware, given malware's ability to damage computing systems and/or spread across a network and do further harm.

As discussed above, a sandbox testing environment 1780 can include one or more servers 1782a, 1782b that each can be executing a number of virtual machines 1784a-1784d, 1786a-1786d. The virtual machines 1784a-1784d, 1786a-1786d can be configured for identifying and analyzing malware programs.

In various implementations, the sandbox testing environment 1780 can also be used to determine characteristics that identify the operating environment of the virtual machines 1784a-1784d, 1786a-1786d as associated with the sandbox testing environment 1780. Such characteristics include, for example, processes associated with virtual machines, particular MAC addresses, particular entries in a system registry, the structure and/or contents of the file systems on the virtual machines 1784a-1784d, 1786a-1786d, and/or a particular pattern of behavior of the virtual machines 1784a-1784d, 1786a-1786d. In some implementations, determination of these characteristics can be conducted by another network device and/or by the network security infrastructure 1730.

These characteristics that can identify an operating environment as being inside the sandbox testing environment 1780 can be used to immunize the nodes 1710a-1710g in the network 1700 from malware that is designed not to activate when in a sandbox. For example, virtual machines 1760a-1760g can be started on each of the nodes 1710a-1710g, and the normal operation of the nodes 1710a-1710g can be conducted within the virtual machines 1760a-1760g. As another example, instead of running virtual machines on each node 1710a-1710g, processes associated with virtual machines can be started on the nodes 1710a-1710g. As another example, files, directories, system registry entries, and/or other data found in the sandbox testing environment 1780 can be replicated on the nodes 1710a-1710g.

Once the nodes 1710a-1710g have been made to resemble the sandbox testing environment 1780, the nodes 1710a-1710g can be protected from certain kinds of malware attacks. For example, a malware program 1790 may find its way onto one of the nodes 1710g. The malware program, however, may erroneous determine that the node 1710g is in a sandbox, and thus—in an attempt to avoid detection—not activate.

In various implementations, the techniques discussed above, including cyber vaccination against specific malware, cyber antibody techniques that block a malware program's communication channel, and a generic cyber vaccination scheme, can be used in various combinations, to provide multiple, immediate defenses against malware attacks. Additionally, each technique can be used in combination with existing network security techniques and tools.

Specific details were given in the preceding description to provide a thorough understanding of various implementations of systems and components for cyber vaccines and antibodies. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for cyber vaccines and antibodies.

As used below, any reference to a series of examples is to be understood as a reference to each of those examples disjunctively (e.g., "Examples 1-4" is to be understood as "Examples 1, 2, 3, or 4").

Example 1 is a method, where the method comprises determining, by a network device infected by a malware program, a marker generated by the malware program. The marker indicates to the malware program that the network device has been infected by the malware program. Determining the marker includes identifying a placement of the marker on the network device. The method further includes identifying one or more other network devices that have not previously been infected by the malware program. The method further includes automatically distributing copies of the marker. When a copy of the marker is received at an identified network device from the one or more other network devices, the identified network device places the marker on the identified network device according to the identified placement.

Example 2 is the method of claim 1, where determining the marker includes comparing a first snapshot of the network device with a second snapshot of the network device. The first snapshot was taken before the infection by the malware program started, and the second snapshot was taken at a pre-determined time after the infection started. The method further includes determining one or more differences between the first snapshot and the second snapshot.

Example 3 is the method of examples 1-2, where determining the marker includes determining a change in a system registry of the network device.

Example 4 is the method of examples 1-3, where determining the marker includes determining a change in a file system of the network device.

Example 5 is the method of examples 1-4, where determining the marker includes identifying a process running on the network device.

Example 6 is the method of examples 1-5, where determining the marker includes identifying a user logged in to the network device.

Example 7 is the method of examples 1-6, where determining the marker includes determining a change in a system memory of the network device.

Example 8 is the method of examples 1-7, where determining the marker includes identifying an open port of the network device.

Example 9 is the method of examples 1-8, where the method further comprises identifying the network device as infected by the malware program.

Example 10 is the method of examples 1-9, where the method further comprises activating the malware program on the network device.

Example 11 is the method of examples 1-10, where presence of a copy of the marker on a network device from the one or more other network devices represents the network device as infected by the malware program.

Example 12 is the method of examples 1-11, where determining the marker occurs in real time.

Example 13 is the method of examples 1-12, where automatically distributing the copies of the marker includes using a remote administration tool.

Example 14 is a network device, which includes one or more processors and a non-transitory computer-readable medium. The non-transitory compute readable medium includes instructions that, when executed by the one or more processors, cause the one or more processors to perform operations according to the method(s) of examples 1-13.

Example 15 is a computer-program product tangibly embodied in a non-transitory machine-readable storage medium, including instructions that, when executed by one or more processors, cause the one or more processors to perform steps according to the method(s) of examples 1-13.

Example 16 is a method, where the method comprises monitoring, by a network device infected with an unknown malware program, one or more packets sent by the network device onto a network. The method further includes identifying a packet that is associated with the unknown malware program. The packet is identified from among the monitored packets, and identifying the packet includes determining a characteristic of the packet. The method further includes identifying one or more other packets having a characteristic similar to the characteristic of the packet. The method further includes inserting data associated with a known malware program into the one or more other packets. The method further includes automatically distributing the characteristic of the packet. When the characteristic is received at another network device, the characteristic is used to identify additional packets having a characteristic similar to the characteristic of the packet.

Example 17 is the method of example 16, where identifying the packet associated with the malware program includes determining a process that generated the packet.

Example 18 is the method of examples 16-17, where determining the characteristic of the packet includes examining a header portion of the packet.

Example 19 is the method of examples 16-18, where examining the header portion includes identifying one or more of a source address, a destination address, a network service type, an identifier, a class, or a label.

Example 20 is the method of examples 16-19, where determining the characteristic of the packet includes examining a payload portion of the packet.

Example 21 is the method of examples 16-20, where examining the payload portion includes identifying for a character string.

Example 22 is the method of examples 16-21, where the data associated with the known malware program infects the one or more other packets with the known malware program.

Example 23 is the method of examples 16-22, where the known malware program is blocked by network security infrastructure devices.

Example 24 is the method of examples 16-23, where monitoring the packets includes monitoring for minutes, hours, days, or weeks.

Example 25 is the method of examples 16-24, where the method further comprises receiving a new characteristic from the network, wherein the new characteristic is associated with a new malware program. The method further comprises configuring a process with the new characteristic, wherein the process inserts the digital signature in other packets with a similar characteristic.

Example 26 is the method of examples 16-25, where identifying the packet occurs in real time.

Example 27 is the method of examples 16-26, where automatically distributing the characteristic includes using remote administration tools.

Example 28 is the method of examples 16-27, where automatically distributing the characteristic includes generating a file system path to the other network device.

Example 29 is the method of examples 16-28, where automatically distributing the characteristic includes generating an email address. In this example, email sent to the email address is sent to the other network device.

Example 30 is the method of examples 16-29, where the network includes a network security infrastructure device. The network security infrastructure device is configured to block packets that include the data associated with the known malware program.

Example 31 is a network device, which includes one or more processors and a non-transitory computer-readable medium. The non-transitory compute readable medium includes instructions that, when executed by the one or more processors, cause the one or more processors to perform operations according to the method(s) of examples 16-30.

Example 32 is a computer-program product tangibly embodied in a non-transitory machine-readable storage medium, including instructions that, when executed by one or more processors, cause the one or more processors to perform steps according to the method(s) of examples 16-30.

Example 33 is a method, where the method comprises determining, by a network device on a network, one or more characteristics of a testing environment. The testing environment is used to analyze malware programs. The method further includes configuring a production network device used in network operations. The production network device is configured using the one or more characteristics. Network operations exclude analyzing malware programs. Configuring the production network device with the one or more characteristics causes the production network device to resemble the testing environment.

Example 34 is the method of example 33, where the testing environment includes a virtual machine.

Example 35 is the method of examples 33-34, where the one or more characteristics include a process associated with a virtual machine.

Example 36 is the method of examples 33-35, where the one or more characteristics include a particular Media Access Control (MAC) address.

Example 37 is the method of examples 33-36, where the one or more characteristics include an entry in a system registry.

Example 38 is the method of examples 33-37, where the one or more characteristics include one or more of a structure or content of a file system.

Example 39 is the method of examples 33-38, where the one or more characteristics include an execution path of a process associated with the testing environment.

Example 40 is the method of examples 33-39, where the method further comprises automatically distributing the one or more characteristics to one or more other network devices.

Example 41 is the method of examples 33-40, where the method further comprises configuring the network device with the one or more characteristics.

Example 42 is the method of examples 33-41, where the method further comprises receiving a malware program. The malware program is configured to execute upon determining that the malware program is not in the testing environment.

What is claimed is:

1. A method for immunizing a network device from a malware program, comprising:
    initiating a virtual machine in a testing environment, wherein the testing environment is a closed and monitored computing environment in which malware programs can be run and analyzed, wherein the testing environment prevents the malware programs from infecting other network devices, wherein the virtual machine is configured to emulate a computing device in a network, the configuration including a hardware configuration and a software configuration of the computing device, and wherein the virtual machine executes on a server computer in the testing environment;
    generating a first snapshot of the virtual machine, wherein the first snapshot captures a state of the virtual machine at a first point in time, the state including a software state and a hardware state, and wherein the first snapshot includes contents of a memory of the server computer;
    executing a malware program on the virtual machine;
    generating a second snapshot of the virtual machine, wherein the second snapshot captures a state of the virtual machine at a second point in time, wherein the second point in time occurs after the malware program has executed;
    determining a marker generated by the malware program, wherein the marker indicates to the malware program that the virtual machine has been infected by the malware program, wherein determining the marker includes comparing the first snapshot to the second snapshot to identify a difference in the software state or the hardware state of the virtual machine after the malware program executed, and wherein determining the marker includes identifying a placement of the marker on the virtual machine; and
    distributing copies of the marker to one or more network devices on the network, wherein, when a copy of the marker is received at a network device from the one or more network devices, the network device places the marker on the network device in a location corresponding to the placement of the marker on the virtual machine, wherein, when the malware program migrates to the network device, the malware program incorrectly determines that the network device is already infected by the malware program, and wherein, using the incorrect determination, the malware program does not infect the network device.

2. The method of claim 1, wherein determining the marker occurs in real time.

3. The method of claim 1, wherein distributing the copies of the marker includes using a remote administration tool.

4. The method of claim 1, wherein the marker is static.

5. The method of claim 1, wherein the marker is temporary.

6. The method of claim 1, wherein the marker includes a set of changes observed in the second snapshot.

7. The method of claim 1, further comprising:
    determining a set of differences between the first snapshot and the second snapshot, wherein the marker is among the set of differences, and wherein distributing the copies of the marker includes distributing the set of differences to the one or more network devices on the network.

8. A device configured to immunize a network device from a malware program, comprising:
    one or more processors; and
    a non-transitory computer-readable medium including instructions that, when executed by the one or more processors, cause the one or more processors to perform operations including:
    initiating a virtual machine in a testing environment, wherein the testing environment is a closed and monitored computing environment in which malware programs can be run and analyzed, wherein the testing environment prevents the malware programs from infecting other network devices, wherein the virtual machine is configured to emulate a computing device in a network, the configuration including a hardware configuration and a software configuration of the computing device, and wherein the virtual machine executes on a server computer in the testing environment;
    generating a first snapshot of the virtual machine, wherein the first snapshot captures a state of the virtual machine at a first point in time, the state including a software state and a hardware state, and wherein the first snapshot includes contents of a memory of the server computer;
    executing a malware program on the virtual machine;
    generating a second snapshot of the virtual machine, wherein the second snapshot captures a state of the virtual machine at a second point in time, wherein the second point in time occurs after the malware program has executed;
    determining a marker generated by the malware program, wherein the marker indicates to the malware program that the virtual machine has been infected by the malware program, wherein determining the marker includes comparing the first snapshot to the second snapshot to identify a difference in the software state or the hardware state of the virtual machine after the malware program executed, and wherein determining the marker includes identifying a placement of the marker on the virtual machine; and
    distributing copies of the marker to one or more network devices on the network, wherein, when a copy of the marker is received at a network device from the one or more network devices, the network device places the marker on the network device in a location corresponding to the placement of the marker on the virtual machine, wherein, when the malware program migrates to the network device, the malware program incorrectly determines that the network device is already infected by the malware program, and wherein, using the incorrect determination, the malware program does not infect the network device.

9. The network device of claim 8, wherein determining the marker occurs in real time.

10. The network device of claim 8, wherein the instructions for distributing the copies of the marker include instructions that, when executed by the one or more processors, cause the one or more processors to perform operations including:
using a remote administration tool.

11. The device of claim 8, wherein the marker is static.

12. The device of claim 8, wherein the marker is temporary.

13. The device of claim 8, wherein the marker includes a set of changes observed in the second snapshot.

14. The device of claim 8, wherein the non-transitory computer-readable medium further includes instructions that, when executed by the one or more processors, cause the one or more processors to perform operations including:
determining a set of differences between the first snapshot and the second snapshot, wherein the marker is among the set of differences, and wherein distributing the copies of the marker includes distributing the set of differences to the one or more network devices on the network.

15. A computer-program product for immunizing an network device from a malware program, tangibly embodied in a non-transitory machine-readable storage medium, the computer-program product including instructions that, when executed by one or more processors, cause the one or more processors to:
initiate a virtual machine in a testing environment, wherein the testing environment is a closed and monitored computing environment in which malware programs can be run and analyzed, wherein the testing environment prevents the malware programs from infecting other network devices, wherein the virtual machine is configured to emulate a computing device in a network, the configuration including a hardware configuration and a software configuration of the computing device, and wherein the virtual machine executes on a server computer in the testing environment;
generate a first snapshot of the virtual machine, wherein the first snapshot captures a state of the virtual machine at a first point in time, the state including a software state and a hardware state, and wherein the first snapshot includes contents of a memory of the server computer;
execute a malware program on the virtual machine;
generate a second snapshot of the virtual machine, wherein the second snapshot captures a state of the virtual machine at a second point in time, wherein the second point in time occurs after the malware program has executed;
determine a marker generated by the malware program, wherein the marker indicates to the malware program that the virtual machine has been infected by the malware program, wherein determining the marker includes comparing the first snapshot to the second snapshot to identify a difference in the software state or the hardware state of the virtual machine after the malware program executed, and wherein determining the marker includes identifying a placement of the marker on the virtual machine; and
distribute copies of the marker to one or more network devices on the network, wherein, when a copy of the marker is received at a network device from the one or more network devices, the network device places the marker on the network device in a location corresponding to the placement of the marker on the virtual machine, wherein, when the malware program migrates to the network device, the malware program incorrectly determines that the network device is already infected by the malware program, and wherein, using the incorrect determination, the malware program does not infect the network device.

16. The computer-program product of claim 15, wherein determining the marker occurs in real time.

17. The computer-program product of claim 15, wherein the instructions for distributing the copies of the marker include instructions that, when executed by the one or more processors, cause the one or more processors:
use a remote administration tool.

18. The computer-program product of claim 15, wherein the marker is static.

19. The computer-program product of claim 15, wherein the marker is temporary.

20. The computer-program product of claim 15, wherein the marker includes a set of changes observed in the second snapshot.

21. The computer-program product of claim 15, further including instructions that, when executed by the one or more processors, cause the one or more processors to:
determine a set of differences between the first snapshot and the second snapshot, wherein the marker is among the set of differences, and wherein distributing the copies of the marker includes distributing the set of differences to the one or more network devices on the network.

* * * * *